(12) United States Patent
Brinkmann et al.

(10) Patent No.: US 11,038,410 B2
(45) Date of Patent: Jun. 15, 2021

(54) STATOR MODULE AND PLANAR DRIVE SYSTEM

(71) Applicant: Beckhoff Automation GmbH, Verl (DE)

(72) Inventors: Rolf Brinkmann, Bad Salzuflen (DE); Lukas Bentfeld, Delbrück (DE); Jörg Neufeld, Paderborn (DE)

(73) Assignee: Beckhoff Automation Gmbh, Verl (DE)

( * ) Notice: Subject to any disclaimer, the term of this patent is extended or adjusted under 35 U.S.C. 154(b) by 0 days.

(21) Appl. No.: 16/890,887

(22) Filed: Jun. 2, 2020

(65) Prior Publication Data

US 2020/0321846 A1    Oct. 8, 2020

Related U.S. Application Data

(63) Continuation of application No. PCT/DE2018/085861, filed on Dec. 19, 2018.

(30) Foreign Application Priority Data

Dec. 27, 2017  (DE) .......................... 102017131324.9

(51) Int. Cl.
*H02K 41/03* (2006.01)
*H02K 11/215* (2016.01)
(Continued)

(52) U.S. Cl.
CPC .............. *H02K 41/03* (2013.01); *H02K 5/18* (2013.01); *H02K 9/18* (2013.01); *H02K 9/22* (2013.01);
(Continued)

(58) Field of Classification Search
CPC .... H02K 41/03; H02K 41/031; H02K 11/215; H02K 5/18; H02K 9/18; H02K 9/22; H02K 2201/18; H02K 2211/03
(Continued)

(56) References Cited

U.S. PATENT DOCUMENTS 6,114,781 A    9/2000  Hazelton et al.
6,226,073 B1 *  5/2001  Emoto .................... G03F 7/707
                                                                310/12.06

(Continued)

FOREIGN PATENT DOCUMENTS

CN    202713114 U    1/2013
CN    104333193 A    2/2015
(Continued)

OTHER PUBLICATIONS

International Preliminary Examination Report (IPRP) for International Patent Application No. PCT/EP2018/085861, dated Dec. 2, 2019 (14 pages, including English translation).
(Continued)

*Primary Examiner* — Michael Andrews
(74) *Attorney, Agent, or Firm* — Dorsey & Whitney LLP

(57) ABSTRACT

A stator module is disclosed, and a planar drive system with a stator module. The stator module has a lower face opposite an upper face, a stator unit situated on the upper face, and a cooling unit. The stator unit has a coil to which current can be supplied to generate a magnetic field to drive a mover, positionable on the upper face of the stator module. The cooling unit has a cover thermally connected to a lower face of the stator unit and to the bottom of the housing. The bottom of the housing has a first fastening section on the lower face of the stator module, thermally connectable to a heat sink. The cover is designed to conduct heat out of the stator unit to the bottom of the housing, which is designed (Continued)

to conduct the heat at least partially to the first fastening section.

19 Claims, 17 Drawing Sheets

(51) Int. Cl.
*H02K 5/18* (2006.01)
*H02K 9/18* (2006.01)
*H02K 9/22* (2006.01)

(52) U.S. Cl.
CPC ....... *H02K 11/215* (2016.01); *H02K 2201/18* (2013.01); *H02K 2211/03* (2013.01)

(58) Field of Classification Search
USPC .......................................... 310/12.05, 12.06
See application file for complete search history.

(56) References Cited

U.S. PATENT DOCUMENTS

| | | | | |
|---|---|---|---|---|
| 2003/0192686 | A1* | 10/2003 | Hisai | H01L 21/67109 165/201 |
| 2006/0220478 | A1* | 10/2006 | Emoto | H02K 9/00 310/58 |
| 2013/0069449 | A1* | 3/2013 | Pharand | H02K 41/031 310/12.02 |
| 2013/0164687 | A1* | 6/2013 | Binnard | H02K 9/22 430/322 |

FOREIGN PATENT DOCUMENTS

| | | |
|---|---|---|
| CN | 205407498 U | 7/2016 |
| WO | 2009083891 A2 | 7/2009 |
| WO | 2013059934 A1 | 5/2013 |
| WO | 2015017933 A1 | 2/2015 |
| WO | 2015179962 A1 | 12/2015 |
| WO | 2015184553 A1 | 12/2015 |
| WO | 2015188281 A1 | 12/2015 |
| WO | 2017004716 A1 | 1/2017 |
| WO | 2019129547 A1 | 7/2019 |
| WO | 2019129561 A1 | 7/2019 |
| WO | 2019129562 A1 | 7/2019 |
| WO | 2019129564 A1 | 7/2019 |
| WO | 2019129566 A1 | 7/2019 |
| WO | 2019129576 A1 | 7/2019 |
| WO | 2020020605 A1 | 1/2020 |
| WO | 2020020607 A1 | 1/2020 |

OTHER PUBLICATIONS

Office Action dated Dec. 22, 2020 in connection with Chinese patent application No. 201880084398.8, 9 pages including English translation.

* cited by examiner

STATOR MODULE AND PLANAR DRIVE SYSTEM

CROSS-REFERENCE TO RELATED APPLICATIONS

This application is a continuation of International Application PCT/EP2018/085861, filed Dec. 19, 2018, entitled STATOR MODULE AND PLANAR DRIVE SYSTEM, which claims priority to German Patent Application DE 10 2017 131 324.9, filed Dec. 27, 2017, entitled STATOR-MODUL UND PLANARANTRIEBSSYSTEM, each of which is incorporated by reference herein, in the entirety and for all purposes.

FIELD

The invention relates to a stator module of a planar actuator system and a planar actuator system with a stator module.

BACKGROUND

Planar actuator systems are used, amongst other things, in automation technology, in particular manufacturing technology, handling technology and process technology. By means of a planar actuator system, a movable element of an installation or machine can be moved or positioned in at least two linearly independent directions. Planar actuator systems can comprise a permanently excited electromagnetic planar motor, wherein the planar motor has a stator with a flat, planar surface and a moving body which is movable over the surface in at least two directions.

The invention relates, in particular, to a planar actuator system with an electromagnetic planar motor, in which the drive force on the moving body is generated by conductors which are arranged in a stationary manner on the stator and carry a drive current, which conductors interact with drive magnets arranged on the moving body. To generate the required drive current for the movement of the moving body, the stator generally has one or more current-generating units.

To detect the position of the moving body above the stator, the planar actuator system can comprise a position-detection unit arranged on the stator, which interacts with the moving body. Such an interaction can take place magnetically, for example, by magnetic field sensors and magnets arranged on the moving body. For precise determination of the position of the moving body, the interaction between the moving body and the position-detection unit should be detected with as high a signal-to-noise ratio as possible.

The planar stator of the actuator system can be designed as a stator module, which comprises a stator unit with the current-carrying conductors and electronic components for generating the drive current and for detecting the position of the moving body. The stator unit with the conductors carrying the drive current is generally arranged at the upper side of the stator module. The stator unit generally has a flat or planar surface, along which the moving body is guided during operation. The electronic components for generating the drive current and for detecting the position of the moving body are generally arranged underneath the stator unit in the stator module. Drive currents with a high current strength must occasionally be generated to enable an adequate force to be transferred to the moving body. This can lead to high resistance losses in the current-carrying conductors and therefore to significant heating of the stator module. The drive current is moreover generated as an alternating current. This can lead to high electromagnetic alternating fields, which can disrupt electronic components arranged on the stator. Consequently, functional operation cannot be ensured.

Printed documents WO 2013/059934 A1, WO 2015/017933 A1, WO 2015/179962 A1, WO 2015/184553 A1, WO 2015/188281 A1, WO 2017/004716 A1 each describe such a planar actuator system, which, in each case, comprises an electromagnetic planar motor with a permanently excited moving body and a stator with a plurality of energizable conductors.

A cooling system for a linear or planar motor is furthermore known from U.S. Pat. No. 6,114,781.

SUMMARY

The invention provides a particularly effectively coolable stator unit for a planar actuator system and a particularly compact planar actuator system.

According to one aspect, the stator module has a module upper side extending in a plane and a module underside opposite the module upper side, a stator unit and a cooling unit. The stator unit has at least one coil conductor which can be energized by a drive current to generate a magnetic field for driving a moving body of the planar actuator system, which moving body can be positioned at the module upper side. The stator unit is arranged at the module upper side. The cooling unit has a housing cover and a housing base, wherein the housing cover is arranged between the stator unit and the housing base. The housing cover is thermally connected, at least in part, to a stator underside of the stator unit at a cover upper side of the housing cover. The housing cover is thermally connected to the housing base on a cover underside facing away from the stator unit. The housing base is arranged at the module underside and has a first fastening portion at the module underside. The first fastening portion is thermally connectable to a heat sink. The housing cover is designed to conduct heat from the stator unit to the housing base, wherein the housing base is designed to conduct the heat from the housing cover to the fastening portion, at least in part.

According to another aspect, the planar actuator system has a stator module, a cooling unit and a carrier device, wherein the stator module is designed as described above. The carrier device comprises at least one first carrier element, wherein the first carrier element is mechanically connected to the stator module and carries the stator module, wherein the first carrier element has a third fastening portion on a side facing the stator module, wherein the first fastening portion and the third fastening portion are thermally coupled to one another and are designed to discharge at least a proportion of the heat from the first fastening portion to the third fastening portion, wherein the first carrier element is designed to discharge the proportion of the heat. This configuration has the advantage that a particularly high amount of heat can be dissipated from the stator module at the rear side via the third fastening portion and the first carrier element so that overheating both of the further control unit and the stator module can be reliably prevented.

EXAMPLES

The heat generated by the coil conductor can be removed from the stator module at the rear side, on a module underside opposite the module upper side. Cooling the stator module at the rear side has the advantage that the stator unit is cooled at both sides (both at the upper side and at the underside) so that overheating of the stator unit is reliably prevented. Consequently, the heat generated in the stator unit by the drive current can be reliably dissipated. Functional operation of the stator unit is consequently also enabled at high environmental temperatures. The stator module can furthermore also be used in high environmental temperatures, resulting in a wide field of use of the stator module.

According to a further aspect, the housing cover has a first housing portion and a second housing portion on the side facing the stator unit, wherein the first housing portion and the second housing portion adjoin one another, wherein the housing cover has at least one first heat-conducting structure at the first housing portion, wherein the first heat-conducting structure comprises at least one heat-conducting element, wherein the first heat-conducting element extends in the direction of the stator unit and abuts against the stator unit at a contact face and is thermally coupled to the stator unit, wherein a control unit of the stator module is arranged in the second housing portion. This configuration has the advantage that the housing cover is connected to the stator unit with good thermal conductivity.

According to a further aspect, the first heat-conducting structure comprises a plurality of first heat-conducting elements, wherein the first heat-conducting elements are arranged at a spacing from one another. The formation of eddy currents within the housing cover is consequently reduced, so that heating of the housing cover is reduced. The control unit can furthermore be arranged particularly near to the stator unit so that current paths from the control unit to the stator unit are kept particularly short. Reliable control of the stator unit by the control unit is consequently facilitated.

According to a further aspect, the first heat-conducting element is designed in the form of a pin, wherein the housing cover has a cover portion designed in the form of a plate, wherein the cover portion is arranged at a spacing from the stator unit, wherein, in each case, the first heat-conducting element is connected to the cover portion by a side opposite the first contact face, wherein the first heat-conducting element is aligned at an angle, preferably perpendicularly, to the cover portion. Consequently, the first heat-conducting element can be designed to be particularly short so that material costs for producing the housing cover are particularly low. Furthermore, a heat path between the stator unit and the cover portion is particularly short as a result of avoiding diversions in the transfer of the heat.

According to a further aspect, the cover portion and the stator unit delimit a first interior space of the stator module, wherein the first interior space is filled with a thermally conductive and electrically insulating potting compound such that the control unit is embedded in the potting compound and the potting compound is designed to transfer heat from the stator unit and/or the control unit to the housing cover. The potting compound can additionally ensure a material-fitting connection of the stator unit to the housing cover. Furthermore, as a result of the potting compound, a deflection of the stator unit when a load is introduced into the stator unit via the module upper side is reliably mechanically supported towards the housing cover via the potting compound.

According to a further aspect, the second housing portion is designed to be flat at the cover upper side, wherein the housing cover has an edge on the side facing the stator unit. The edge is preferably formed circumferentially around the housing cover. The edge extends in the direction of the stator unit. The first heat-conducting structure is arranged between the second housing portion and the edge, wherein the second heat-conducting structure extends over the entire first housing portion between the edge and the second housing portion. Consequently, a particularly high amount of heat can be transferred from the stator unit to the housing cover via the first heat-conducting structure.

According to a further aspect, the housing cover has a cover portion designed in the form of a plate, a further edge on a side facing the housing base, a second heat-conducting structure and a center region. The further edge is arranged at the cover portion and extends in the direction of the housing base, wherein the second heat-conducting structure adjoins the further edge internally and has at least one second heat-conducting element. The second heat-conducting element is connected to the cover portion on the side facing away from the housing base and is thermally connected to the housing base on the side facing the housing base. The center region is arranged internally with respect to the second heat-conducting-structure. The center region is surrounded by the second heat-conducting structure, wherein the center region is designed to be planar and is arranged at a spacing from the housing base. By means of the second heat-conducting structure, the heat absorbed by the housing cover can be reliably transferred from the housing cover to the housing base, so that the housing cover has a particularly low thermal resistance. Particularly good cooling can be ensured as a result of the low thermal resistance. The cover portion of the housing cover furthermore ensures reliable heat distribution in the housing cover in the transverse direction as a result of its plate-shaped design, so that the first heat-conducting structure can also be arranged offset from the second heat-conducting structure. An additional structural degree of freedom in the dimensioning of the stator module is consequently provided, thus enabling the geometry of the control unit to be determined flexibly.

According to a further aspect, the stator module has a sensor module. The housing cover and the housing base delimit a second interior space. The sensor module is arranged in the second interior space. The sensor module is electrically connected to the control unit. The sensor module has at least one position-detection unit for detecting a magnetic field of the moving body, a printed circuit board and at least one processing unit. The position-detection unit is connected to the printed circuit board, wherein the printed circuit board connects the processing unit to the position-detection unit. The processing unit is arranged on a side of the printed circuit board which faces the housing cover. A processing-unit receptacle is arranged in the cover portion, on a side facing the housing base. The processing-unit receptacle is designed to correspond to the processing unit, wherein the processing unit engages in the processing-unit receptacle, at least in certain portions. The processing unit is preferably thermally connected to the cover portion, wherein the cover portion is designed to dissipate heat from the processing unit and to conduct it to the housing base for the purpose of cooling the processing unit. As a result of arranging the sensor module between the housing base and the housing cover, the sensor module is not exposed to high eddy currents from the magnetic field of the stator unit. Good detection of the magnetic field of the moving body is furthermore facilitated. The thermal load on the sensor module can furthermore be kept low. To use a particularly powerful processing unit, albeit one with high heat losses, for rapid detection times of the magnetic field of the moving body on the sensor module, the processing unit can be thermally coupled to the housing cover so that the heat losses can be dissipated from the processing unit. However, if the processing unit only generates low heat losses, the processing unit can also be arranged at a spacing from the housing cover in the recess.

According to a further aspect, the printed circuit board has at least one housing passage, wherein the housing passage is designed to correspond to the second heat-conducting element, at least in certain portions. The second heat-conducting element passes through the housing passage and abuts against the housing base at the end. Consequently, the heat to be transferred from the housing cover to the housing base can be guided past the sensor module, without the sensor module itself being located in the heat path. Consequently, a particularly high flow of heat from the stator unit to the module underside can be ensured.

According to a further aspect, the second heat-conducting structure has a plurality of heat-conducting elements, wherein the second heat-conducting elements are arranged at a pre-defined spacing, preferably at a regular spacing, from one another. An intermediate space is arranged between the second heat-conducting elements, wherein the printed circuit board of the sensor module is arranged in the intermediate space, at least in certain portions. Consequently, a particularly compact construction can be realized, along with reliable detection of the magnetic field of the moving body.

According to a further aspect, the stator module has a module cover and a further control unit. The housing base and the module cover delimit a third interior space, wherein the further control unit is arranged in the third interior space, wherein the module cover is arranged on a side facing away from the housing cover and such that it is offset from the first fastening portion, wherein the module cover is thermally connected to the further control unit, wherein the module cover has a cooling rib structure on a side facing away from the housing base.

According to a further aspect, the third interior space is filled with a further potting compound such that the further control unit is embedded in the potting compound, wherein the further potting compound is designed to be thermally conducting and connects the further control unit thermally to the module cover, wherein the module cover is thermally conducting and is designed to transfer a further heat of the further potting compound to the cooling rib structure, and the cooling rib structure is designed to transfer the further heat to the environment. Furthermore, cooling of the further control unit is additionally enabled via the module cover.

According to a further aspect, the housing base has a second fastening portion at the module underside, wherein the module cover is arranged between the first fastening portion and the second fastening portion. The second fastening portion can be thermally coupled to the heat sink and is designed to conduct heat to the heat sink. The first fastening portion and the second fastening portion are arranged in a common plane and aligned parallel to the module upper side.

The planar actuator system has a stator module, a cooling unit and a carrier device, wherein the stator module is designed as described above. The carrier device comprises at least one first carrier element, wherein the first carrier element is mechanically connected to the stator module and carries the stator module, wherein the first carrier element has a third fastening portion on a side facing the stator module, wherein the first fastening portion and the third fastening portion are thermally coupled to one another and are designed to discharge at least a proportion of the heat from the first fastening portion to the third fastening portion, wherein the first carrier element is designed to discharge the proportion of the heat. This configuration has the advantage that a particularly high amount of heat can be dissipated from the stator module at the rear side via the third fastening portion and the first carrier element so that overheating both of the further control unit and the stator module can be reliably prevented.

According to a further aspect, the cooling device has at least one heat carrier medium, wherein the first carrier element delimits at least one first conducting space such that it is fluidically sealed with respect to an environment of the first carrier element, wherein the heat carrier medium is arranged in the conducting space and is thermally coupled to the third fastening portion, wherein the heat carrier medium is designed to dissipate the proportion of the heat from the first carrier element and to conduct it to the heat sink.

According to a further aspect, the carrier device has a second carrier element, wherein the second carrier element delimits a second conducting space such that it is fluidically sealed with respect to the environment of the second carrier element. The second carrier element is arranged offset from the first carrier element, wherein the second carrier element has a fourth fastening portion on a side facing the stator module. The second fastening portion and the fourth fastening portion are thermally connected to one another and are designed to conduct heat from the second fastening portion to the fourth fastening portion, wherein the fourth fastening portion is thermally connected to the second conducting space. The heat carrier medium flows through the second conducting space, wherein the heat carrier medium is designed to dissipate the heat from the fourth fastening portion. Consequently, a reliable active cooling system can be provided, which requires little installation space at the underside of the stator module.

According to a further aspect, the carrier device has a fluid line. The fluid line fluidically connects the first conducting space to the second conducting space. The heat carrier medium is arranged in the second conducting space and the fluid line. The heat carrier medium flows through the first conducting space, the fluid line and the second conducting space. In this case, the heat carrier medium is designed to dissipate the heat from the fourth fastening portion. Active cooling of the carrier elements is consequently enabled, whereby a particularly high amount of heat can be dissipated from the stator module via the carrier elements so that a particularly high amount of heat can also be conducted from the stator module to the heat sink in the event of a high thermal load on the stator module, in particular when numerous moving bodies are moved over the stator module for short periods of time, in particular when moving bodies are decelerated over the stator module, for example.

According to a further aspect, the cooling unit has a delivery pump and a heat exchanger, wherein the heat exchanger has a primary side and a secondary side, wherein the delivery pump is fluidically connected to the conducting space and to the primary side of the heat exchanger. The delivery pump is designed to deliver the heat carrier medium in a circuit between the primary side and the conducting space, wherein the secondary side is thermally connected to the heat sink. The heat exchanger is designed to conduct the heat from the primary side to the secondary side and to transfer it to the heat sink at the secondary side. Consequently, the heat carrier medium can be a liquid coolant, which can absorb a particularly high amount of heat. Through the introduction of the heat exchanger, a particularly high temperature difference between the carrier elements and the fastening portions of the carrier elements and the heat carrier medium can be enabled, so that a particularly high amount of heat can be transferred from the carrier elements and therefore also from the stator module to the heat carrier medium.

According to a further aspect, the first carrier element has a hollow profile, at least in certain portions, or the first carrier element has a solid profile designed in the form of a plate. The configuration as a hollow profile has the advantage that the carrier element is mechanically rigid and very light. The solid profile has the advantage that a particularly high amount of heat can be dissipated by the first carrier element.

BRIEF DESCRIPTION OF THE DRAWINGS

The invention will be discussed in more detail below on the basis of figures. Here, in a schematic illustration in each case.

DETAILED DESCRIPTION

In the following figures, reference is made to a coordinate system. The coordinate system has an x-axis (longitudinal direction), a Y-axis (transverse direction) and a z-axis (vertical direction). The coordinate system is designed, by way of example, as a right-handed system and serves for easier understanding of the planar actuator system 1 shown in the figures.

This disclosure relates substantially to further developments of the planar actuator systems disclosed in publications WO 2013/059934 A1, WO 2015/017933 A1, WO 2015/179962 A1, WO 2015/184553 A1, WO 2015/188281 A1 and WO 2017/004616 A1. The disclosure of the said printed documents also forms the subject matter of this description, each being incorporated in its entirety by reference.

Figure 1:
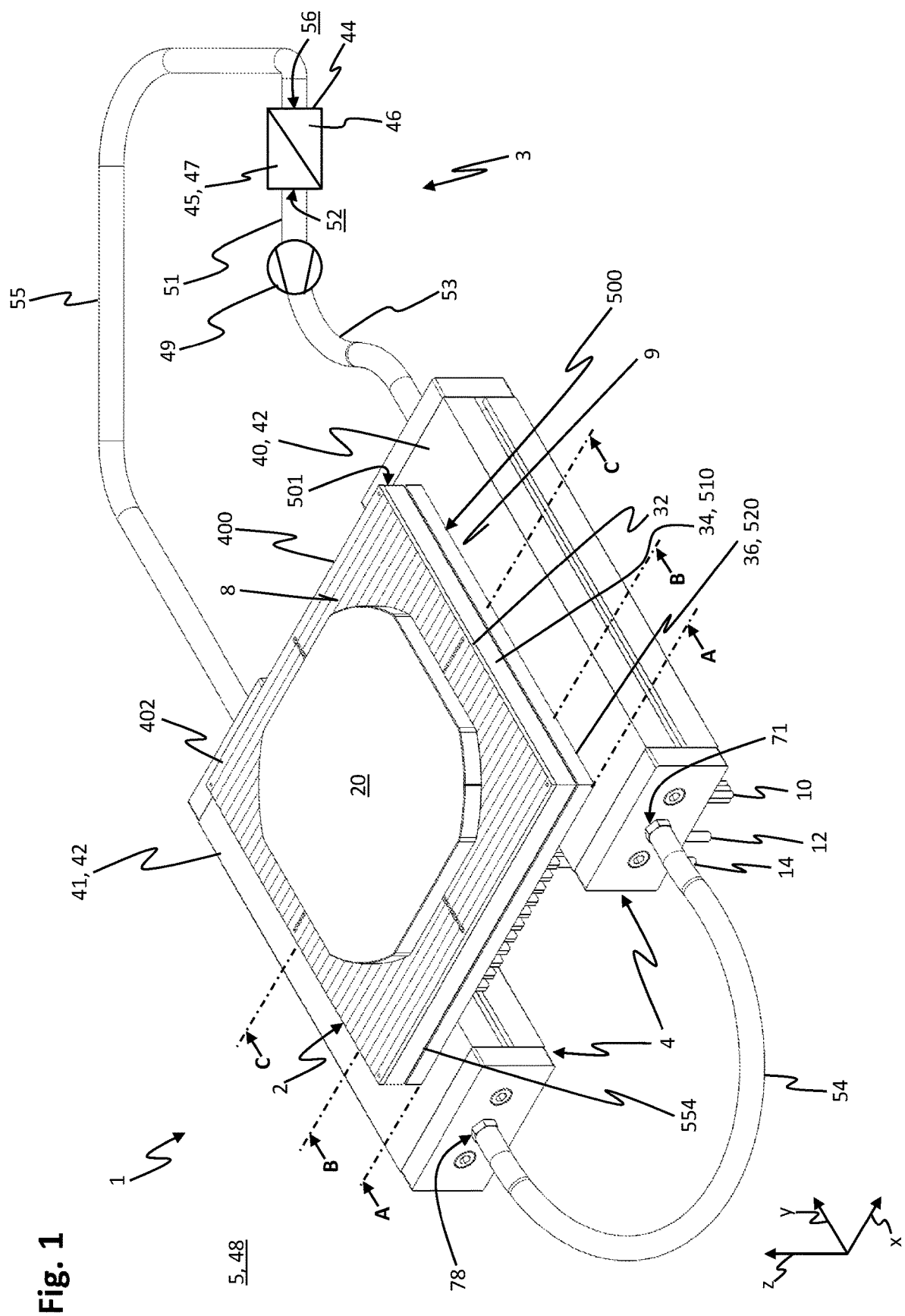
FIG. 1 shows a perspective illustration of a planar actuator system from above.

FIG. 1 shows a perspective illustration of a planar actuator system 1 according to a first embodiment, with the planar actuator system 1 viewed from above.

The planar actuator system 1 has a stator module 2, a cooling device 3, a carrier device 4 and a moving body 20.

The stator module 2 comprises a stator unit 400 and a cooling unit 500. The stator unit 400 has, at the upper side, on a side facing the viewer, a module upper side 8 extending in an xy plane. The configuration of the module upper side 8 can be freely selected. Therefore, by way of example, the module upper side 8 is designed to be rectangular, in particular square, as illustrated in FIG. 1. The module upper side 8 is designed to be substantially planar and extends over an entire upper side of the stator unit 400. The stator module 2 is designed to be flat in the embodiment, so that an extent in the z direction is considerably smaller than an extent of the stator module 2 in the x and/or y direction.

In FIG. 1, the moving body 20 is arranged at the upper side of the module upper side 8. In FIG. 1, the geometric configuration of the moving body 20 is illustrated, merely by way of example, as a plate and can be freely selected.

Opposite the module upper side 8, offset in the z direction, the stator module 2 has a module underside 9 on a side facing away from the viewer. By way of example, the module upper side 8 and the module underside 9 are arranged to extend parallel to one another.

The stator unit 400 has at least one coil conductor 402 to which a drive current can be applied. By way of example, the stator unit 400 can have a plurality of coil conductors 402, as indicated in FIG. 1. By means of the drive current in the coil conductor 402, a magnetic field can be generated, which interacts with at least one drive magnet of the moving body 20 and drives the moving body 20. The moving body 20 is arranged to be movable over the module upper side 8 during operation and can be driven both in the x direction and in the y direction. The moving body 20 can also be lifted away from the module upper side 8 (to a limited extent) in the vertical direction or it can be deposited onto the module upper side 8 when the drive current subsides. The moving body 20 is freely movable. In this case, the moving body 20 can, in particular, be moved simultaneously in the x direction and/or the y direction and/or the z direction. The moving body 20 can also be tilted about the y axis or the x axis. A rotation about the z axis is likewise conceivable. However, the individual movement directions of the moving body 20 can also be combined with one another and do not have to be carried out successively. This can be achieved in each case by controlling the coil conductors 402 accordingly or by the drive current.

Laterally, the stator unit 400 has a first lateral face 32, preferably four first lateral faces 32, which are arranged at a right angle to one another. The cooling unit 500 is arranged underneath the stator unit 400.

The cooling unit 500 comprises a module housing 501 with a housing cover 510 and a housing base 520. The housing cover 510 has at least one second lateral face 34. The first lateral face 32 and the second lateral face 34 can be arranged in alignment. An offset arrangement, for example in the y direction or in the x direction of the two lateral faces 32, 34, is likewise conceivable.

In FIG. 1, the housing base 520 is arranged at the underside of the housing cover 510. Laterally, the housing base 520 has a third lateral face 36. The third lateral face 36 is arranged in alignment with the first and second lateral face 32, 34 in FIG. 1. The third lateral face 36 could also be arranged offset from the first and/or second lateral face 32, 34. As a result of the aligned arrangement of the lateral faces 32, 34, 36, the stator module 2 has a particularly compact configuration in the longitudinal and transverse direction.

As illustrated in FIG. 1, the housing cover 510 and the housing base 520 are likewise designed to be flat, so that an extent in the longitudinal direction and/or in the transverse direction is considerably greater in each case than an extent in the vertical direction. In this case, the housing cover 510 is arranged between a stator underside 403 (illustrated in FIG. 16) and the housing base 520. The housing base 520 has the module underside 9 at its underside.

In FIG. 1, an energy supply line 10 for supplying the stator module 2 with electrical energy is guided to the stator module 2 from below. The electrical energy is required to generate the drive current for generating the magnetic field with the coil conductor 402. Furthermore, the electrical energy is required to supply further components of the stator module 2 (which will be addressed in the further figures) with operating energy and/or supply energy. Furthermore, by way of example, at least one data line 12 and preferably a further data line 14 are provided. In this case, the data lines 12, 14 can be part of a data network. The data line 12 and the further data line 14 are arranged offset from one another and are likewise arranged offset from the energy supply line 10 and are guided to the stator module 2 at the underside, preferably parallel to one another.

The carrier device 4 has, by way of example, a first carrier element 40 and a second carrier element 41 as part of a machine bed 42. The first carrier element 40 and the second carrier element 41 are designed in the form of a rod and extend parallel to one another. In FIG. 1, the carrier elements 40, 41 are, by way of example, aligned with their main direction of extent in the y direction. In addition to the configuration of the carrier device 4 shown in FIG. 1, the carrier device 4 can have a plurality of further carrier elements, which are arranged, for example, in the form of a cross with respect to the first and/or second carrier element 40, 41 and are connected to the first and/or second carrier element 40, 41.

The machine bed 42 is preferably designed to be stationary and can furthermore comprise a base plate or a machine base of a manufacturing facility. The machine bed 42 can also additionally have damper bearings for low-vibration mounting of the carrier element 40, 41.

The cooling device 3 has a heat sink 5 and a cooling circuit 43. The cooling circuit 43 comprises a heat exchanger 44, a heat carrier medium 47, a delivery pump 49 and at least one fluid line 51, 53, 54, 55. The cooling circuit 43 is essentially illustrated merely symbolically in FIG. 1. The heat exchanger 44 has a primary side 45 and a secondary side 46. The secondary side 46 is connected to the heat sink 5. The heat sink 5 can be the environment 48 of the heat exchanger 44, for example. The heat exchanger 44 could be designed as a plate heat exchanger, for example.

By way of example, the delivery pump 49 in the embodiment is fluidically connected, at the input side, to an output side 52 of the primary side 45 of the heat exchanger 44 by a first fluid line 51. The first carrier element 40 delimits at least one first conducting space 71 (illustrated in FIG. 2) and the second carrier element 41 delimits a second conducting space 78 (the conducting spaces 71, 78 are shown in detail in FIG. 2). At the output side, the delivery pump 49 is fluidically connected to the first conducting space of the first carrier element 40 by a second fluid line 53. The first conducting space 71 of the first carrier element 40 is fluidically connected to the second conducting space 78 of the second carrier element 41 on a side opposite the second fluid line 53 by a third fluid line 54. On a side opposite the third fluid line 54, the second conducting space 78 of the second carrier element 41 is fluidically connected to an input side 56 of the primary side 45 by a fourth fluid line 55.

By way of example, the heat carrier medium 47 in the embodiment is designed as a fluid, preferably a liquid, and comprises at least one of the following coolants: water, additive, anti-corrosive agent, antifreeze, oil, 1,1,1,2-tetrafluoroethane.

During operation of the cooling circuit 43, the delivery pump 49 delivers the heat carrier medium 47 in a circuit between the primary side 45 and the carrier elements 40, 41. In a further development of the cooling circuit 43 shown in FIG. 1, this can also be formed as a heat pump circuit.

Figure 2:
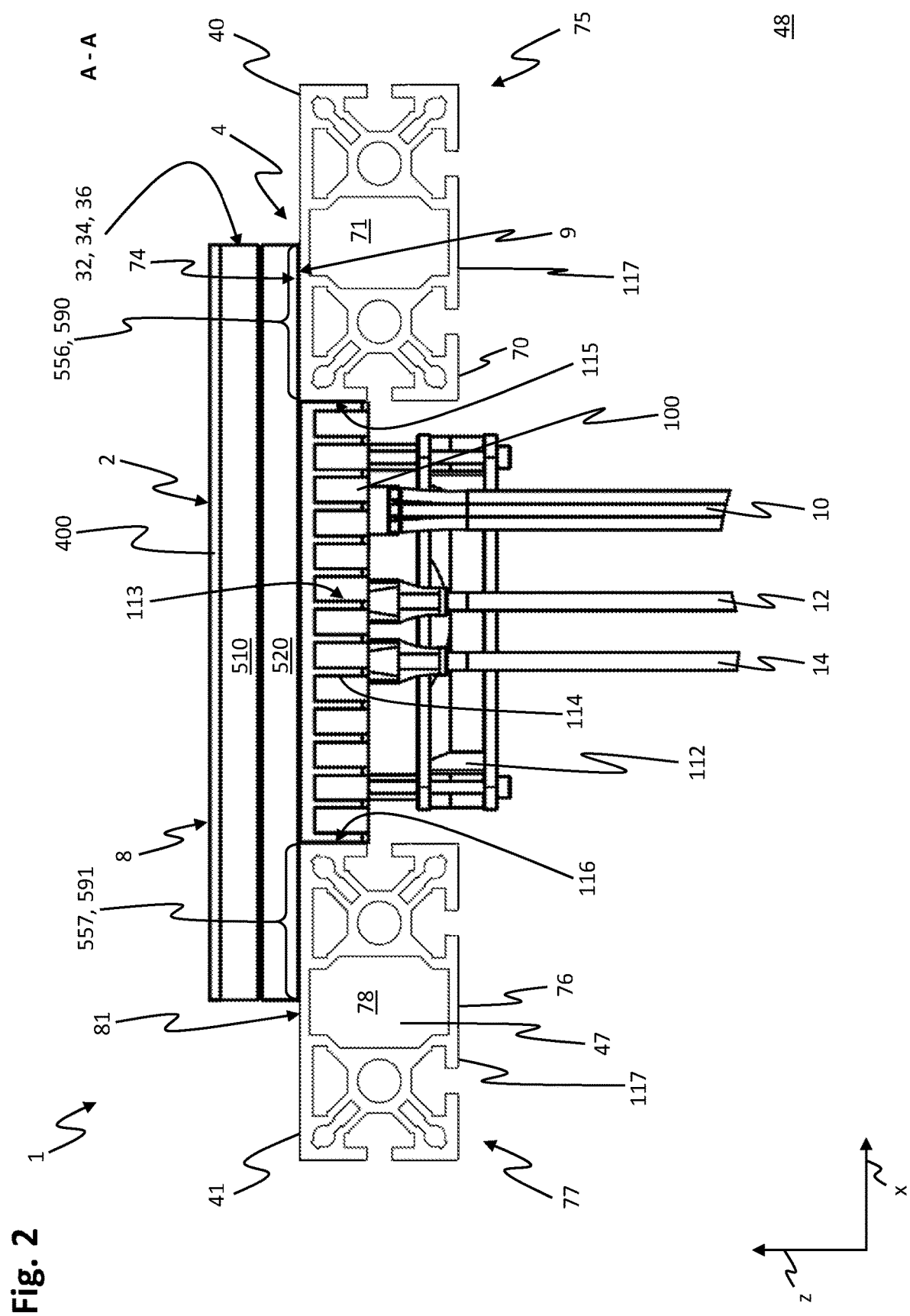
FIG. 2 shows a sectional view along a section plane A-A, shown in FIG. 1, through the planar actuator system shown in FIG. 1.

FIG. 2 shows a sectional view along a section plane A-A, shown in FIG. 1, through the planar actuator system 1 shown in FIG. 1, wherein, for reasons of clarity, the cross-sectional areas have been left unshaded.

The first and second carrier element 40, 41 has a carrier profile 70. The carrier profile 70 is a hollow profile. The carrier profile 70 can be designed, for example, as a face profile 50×100 Type MA1-4 by KANYA (see p. 70 PVS/RVS® General Catalogue 2017 (Edition October 2016) or online under: http://www.kanya.com/de/produkte/list/details/product/frontprofil-50x100/ (Date of access: Nov. 24, 2017). The carrier profile 70 has a fastening region 75, 77 at the underside and, additionally, at least on the side facing the opposing carrier element 40, 41 in each case.

The carrier profile 70 is formed such that the carrier profile 70 delimits at least one first conducting space 71 circumferentially such that the first conducting space 71 is fluidically delimited with respect to the environment 48. In the embodiment, the first conducting space 71 is designed to be substantially rectangular and is arranged centrally, wherein the first fastening region 75 of the carrier profile 70 can be arranged laterally offset from the first conducting space 71 in each case.

The first conducting space 71 is fluidically connected to the second fluid line 53 at one end of the first carrier element 40 and fluidically connected to the third fluid line 54 at another end of the first carrier element 40. The first conducting space 71 is filled, preferably completely, with the heat carrier medium 47.

The first carrier element 40 has a first fastening face 74 on a side (arranged at the upper side in FIG. 2) facing the stator module 2. The first fastening face 74 is designed to be planar and extends in an xy plane. The first carrier element 40 has a first fastening portion 556 on the first fastening face 74. The first fastening portion 556 extends approximately from a side, facing the second carrier element 41, of the first carrier element 40 to a center of the first carrier element 40. Consequently, in FIG. 2, the first carrier element 40 projects laterally over the lateral face of the stator module 2 in the x direction.

The carrier profile 70 of the second carrier element 41 is designed identically to the carrier profile 70 of the first carrier element 40 and delimits a second conducting space 78. The second conducting space 78 is connected to the fourth fluid line 55 at one end of the second carrier element 41 and to the third fluid line 54 at another end of the second carrier element 41. The second conducting space 78 is filled with the heat carrier medium 47.

The second carrier element 41 has a second fastening face 81 at the upper side. The second fastening face 81 is designed to be planar. The first fastening face 74 and the second fastening face 81 are arranged in the same xy plane and are aligned parallel to the module upper side 8. The second carrier element 41 has a second fastening portion 557 at the second fastening face 81. The second fastening portion 557 extends approximately from a side, facing the first carrier element 40, of the second carrier element 41 to a center of the second carrier element 41. Consequently, in FIG. 2, the second carrier element 41 projects laterally over the lateral face 32, 34, 36 of the stator module 2 in the x direction.

The stator module 2 has, at the module underside 9, a third fastening portion 590 and a fourth fastening portion 591 arranged offset from the third fastening portion 590 in the x direction. The third fastening portion 590 and the fourth fastening portion 591 laterally adjoin two opposing third lateral faces 36 of the housing base 520 in each case. The stator module 2 lies flat on the first fastening portion 556 by means of the third fastening portion 590, so that the third fastening portion 590 is thermally coupled to the first carrier element 40. The stator module 2 lies flat on the second fastening portion 557 by means of the fourth fastening portion 591, so that the fourth fastening portion 591 is thermally coupled to the second carrier element 41.

A first fastener can additionally be provided to secure the stator module 2 on the carrier elements 40, 41. The first fastener can be designed in the form of a clip and can be connected to the stator module 2 at one end and to the fastening region 75, 77 of the carrier element 40, 41 at the other end.

The stator module 2 can have a module cover 110, which projects downwards beyond the module underside 9 in the z direction. In the x direction, the module cover 110 is arranged between the first carrier element 40 and the second carrier element 41. Furthermore, the module cover 110 delimits the third and fourth fastening portion 590, 591 in the x direction.

The energy supply line 10 and the data line 12, 14 are guided through the module cover 110 from below. The module cover 110 has a cooling rib structure 113 with a plurality of cooling ribs 114 arranged offset from one another. A first fan 112 of the stator module 2 is optionally additionally arranged at the underside of the module cover 110. The first fan 112 is designed to guide air 139 from the environment 48 via the module cover 110 and the cooling rib structure 113 for cooling the module cover 110. In this case, the first fan 112 can be located at the module cover 110 such that it is at a spacing from the module cover 110.

The first carrier element 40 has a first carrier-element lateral face 115, which is arranged on a side, facing the module cover 110, of the first carrier element 40. On an opposing side in the x direction, the second carrier element 41 has a second carrier-element lateral face 116. The second carrier-element lateral face 116 is arranged on a side, facing the first carrier element 40, of the second carrier element 41. The first carrier-element lateral face 115 and the second carrier-element lateral face 116 are arranged parallel to one another. In this case, the module cover 110 is arranged between the first carrier-element lateral face 115 and the second carrier-element lateral face 116. The module cover 110 preferably abuts laterally against the carrier-element lateral faces 115, 116.

In the vertical direction, the module cover 110 is designed to be flat and, in this case, is designed to be shorter than the carrier elements 40, 41. As a result of the flat configuration of the module cover 110, the first fan 112, as shown in FIG. 2, can also be arranged in part between the first carrier element 40 and the second carrier element 41 in the vertical direction. The first fan 112 only projects beyond an underside 117 of the carrier element 40, 41 in certain portions. In the case of a particularly flat configuration of the first fan 112, the first fan 112 can also be arranged completely between the first carrier element 40 and the second carrier element 41, so that the planar actuator system 1 is designed to be particularly compact.

At the first fan 112, the energy supply line 10 and the data line 12, 14 are guided to the module cover 110 laterally, on a side facing the viewer. This configuration has the advantage that kinking of the energy supply line 10 and/or the data line 12, 14 can also be reliably prevented when the first fan 112 has a flat configuration since, in this case, adequate installation space between the two carrier elements 40, 41 for guiding the energy supply line 10 and/or the data line 12, 14 is ensured.

Figure 3:
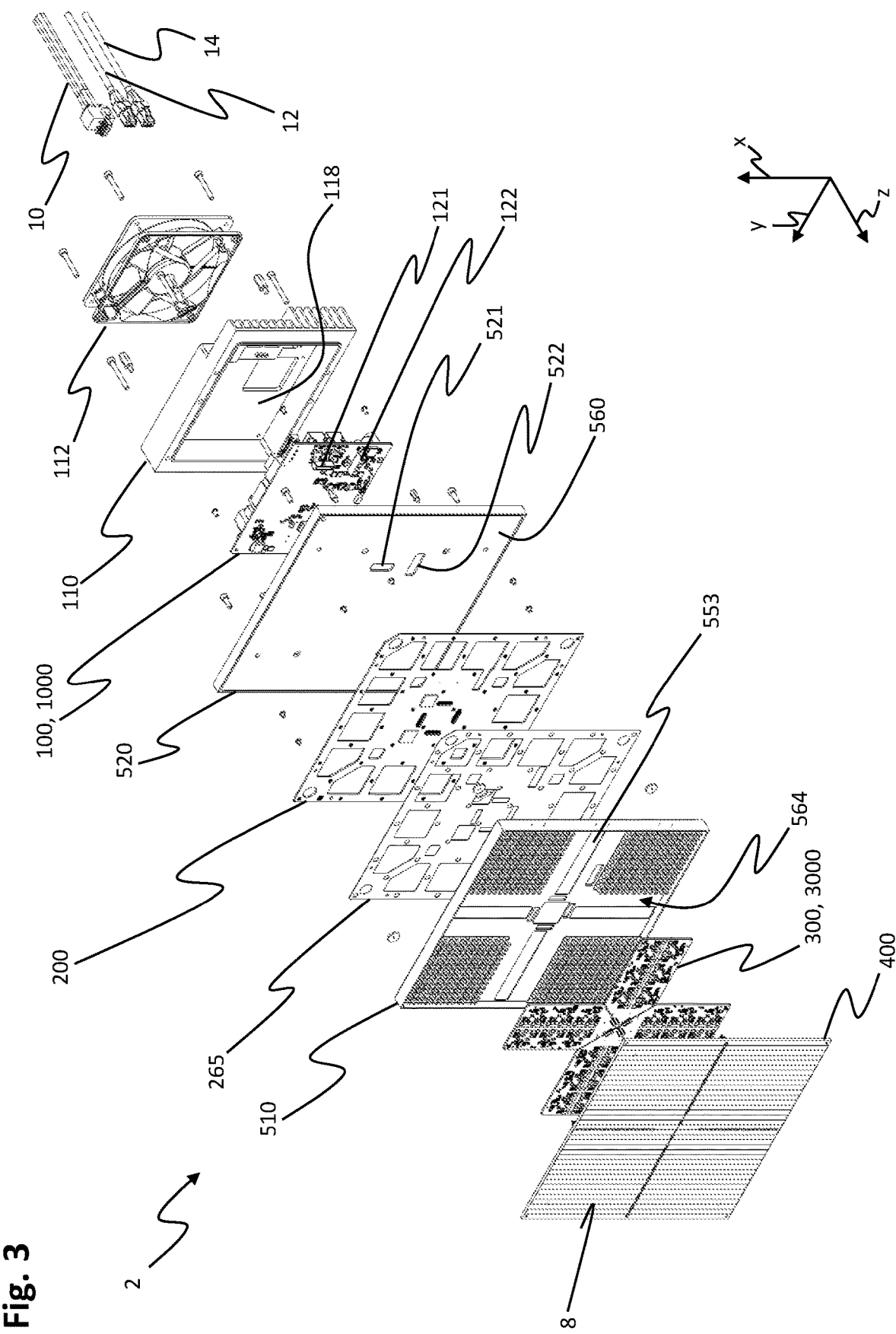
FIG. 3 shows a perspective exploded view of the stator module, with the stator module viewed from above.
Figure 4:
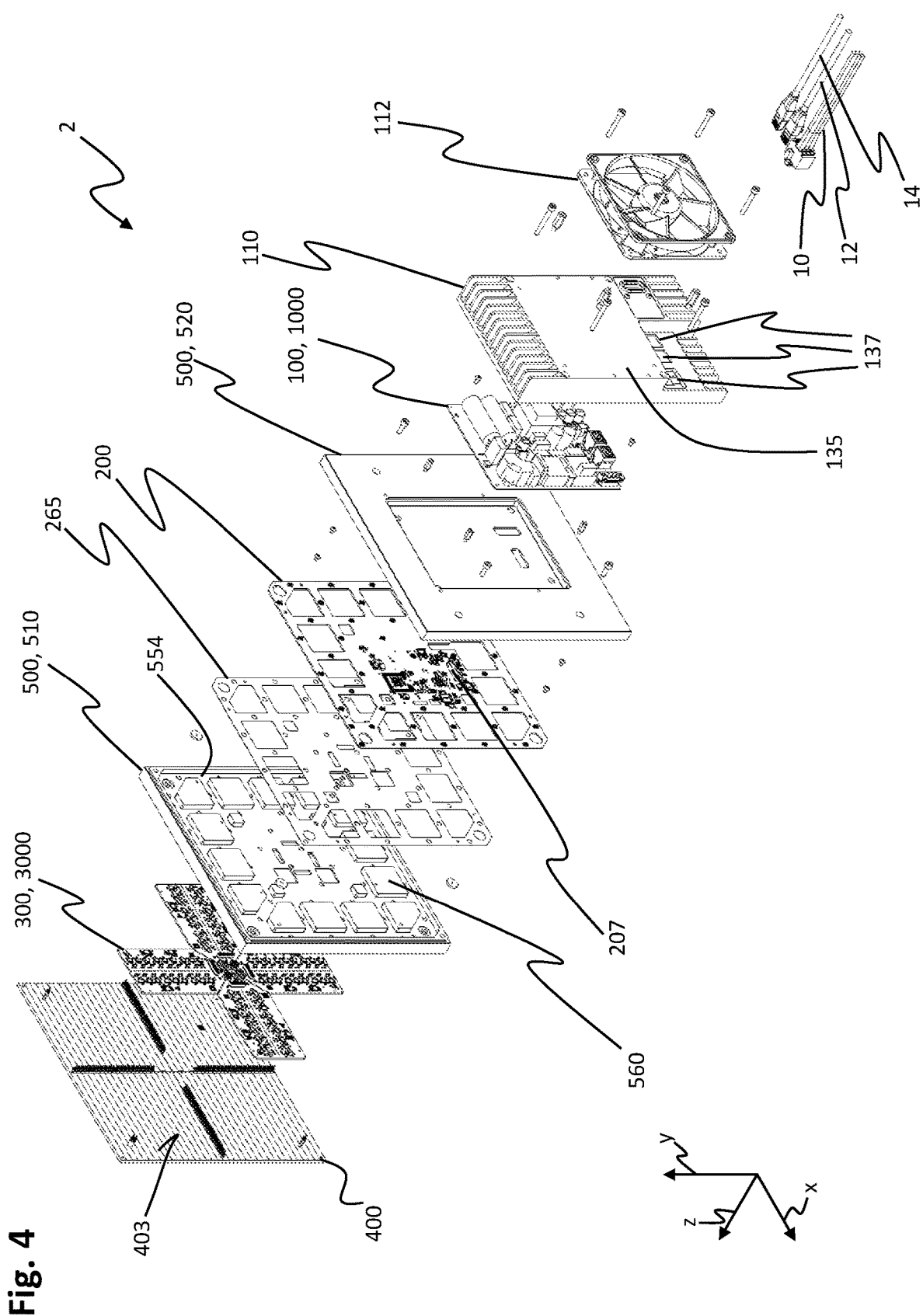
FIG. 4 shows a perspective exploded view of the stator module, with the stator module viewed from below.

FIG. 3 shows a perspective exploded view of the stator module 2, with the stator module 2 viewed from above, and FIG. 4 shows a perspective exploded illustration of the stator module 2, with the stator module 2 viewed from below.

In FIG. 3, the upper sides of the components comprised by the stator module 2 can be seen in each case. In FIG. 4, the undersides of the components comprised by the stator module 2 can be seen in each case. To avoid repetition, the description below relates to FIGS. 3 and 4 without referring to the respective FIG. 3 or FIG. 4 separately again in precise detail.

The stator module 2 comprises, in addition to the components described in the previous figures, a power module 300, also referred to in general as control unit 3000, an insulating layer 265, a sensor module 200 and a connection module 100, also referred to in general as further control unit 1000.

The housing cover 510 abuts against a stator underside 403 of the stator unit 400, at least in certain portions, and is thermally and mechanically connected to the stator unit 400. The housing cover 510 has a cover upper side 553. The cover upper side 553 faces the stator underside 403. The housing cover 510 furthermore has a cover underside 554, wherein, in the closed state of the module housing 501, the cover underside 554 abuts against the upper side of a housing-base upper side 534 of the housing base 520 in certain portions.

The power module 300 is designed in the form of a cross and is arranged at the underside of the stator unit 400 and at the upper side of the housing cover 510 in a first interior space 564, which is delimited by the housing cover 510 and the stator unit 400. At the underside of the housing cover 510, the insulating layer 265 and the sensor module 200 are arranged in a second interior space 560, which delimits the housing cover 510 together with the housing base 520. In this case, the insulating layer 265 is arranged at the underside of the housing cover 510 and at the upper side of the sensor module 200. The sensor module 200 is arranged next to the housing base 520, between the insulating layer 265 and the housing base 520. The housing base 520 delimits the second interior space 560 on a side facing away from the first interior space 564.

The connection module 100 is arranged adjacent to the housing base 520 at the underside. A third interior space 118 is delimited by the housing base 520 and the housing cover 110.

The connection module 100 has, at the upper side, a first contact unit 121 and a second contact unit 122, arranged offset from the first contact unit 121. The contact unit 121, 122 can be designed as elements of a plug connection, as illustrated. In particular, the first and/or the second contact unit 121, 122 can be designed in the manner of a socket.

A first recess 137 is provided in the module cover 110 at the underside 135 of the module cover 110. The energy supply line 10 and the data line 12, 14 are guided through the module cover 110 into the third interior space 118 through the first recess 137.

Figure 5:
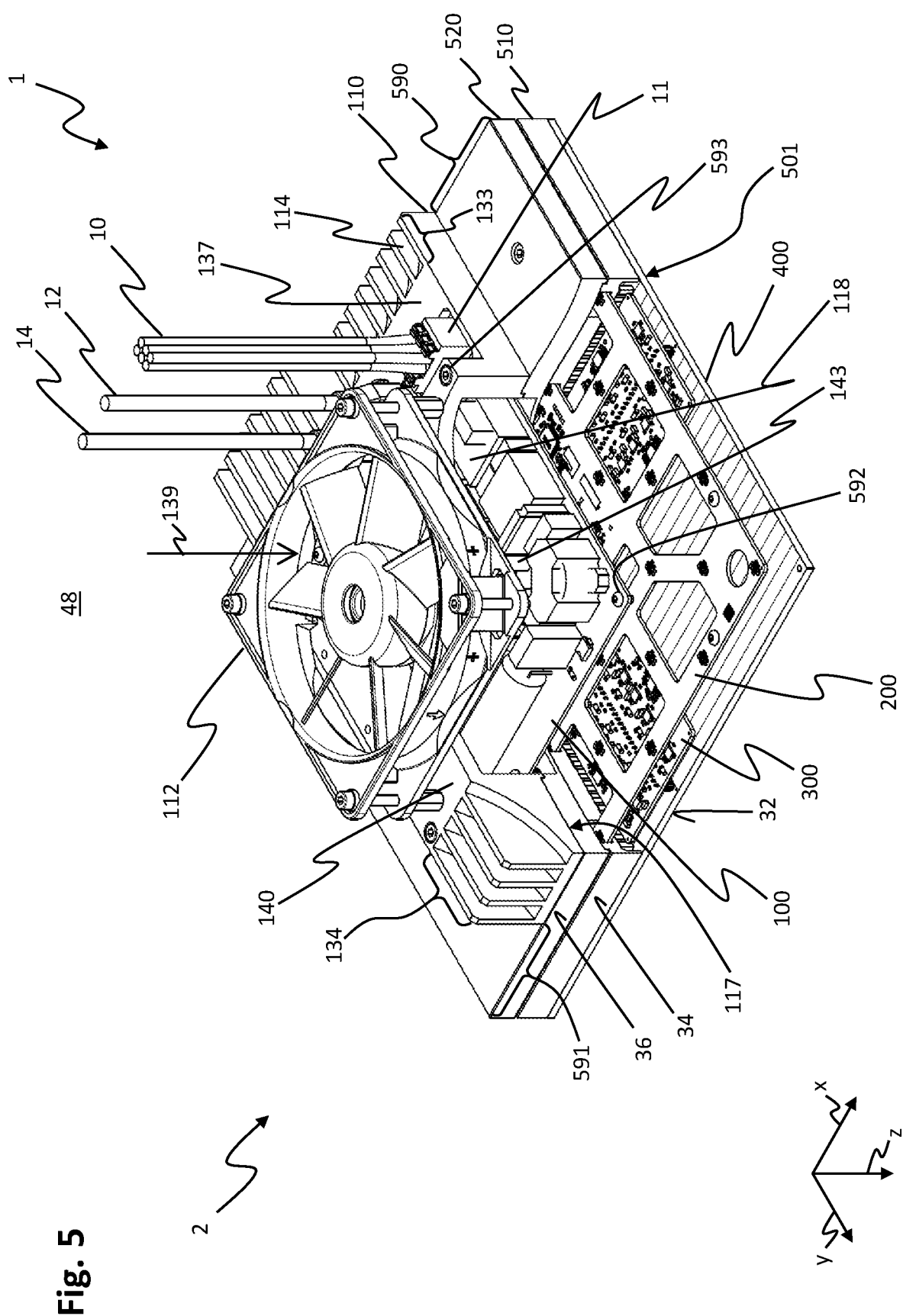
FIG. 5 shows a perspective illustration with a partial sectional view through the stator module of the planar actuator system shown in FIGS. 1 to 4, with the planar actuator system viewed from below.

FIG. 5 shows a perspective illustration with a partial sectional view through the stator module 2, with the planar actuator system 1 viewed from below.

The module cover 110 is designed in the manner of a trough and delimits the third interior space 118 together with the housing base 520 on a side facing away from the stator unit 400. The connection module 100 is connected to the energy supply line 10 and the data line 12, 14 by connector 11. The energy supply line 10 and the data line 12, 14 are guided such that they are offset from the first fan 112 and the cooling ribs 114 in the y direction, and are plugged into the connector 11.

The cooling rib structure 113 illustrated in FIG. 2 is formed at the module cover 110 on both sides in they direction and has a first cooling rib portion 133 and a second cooling rib portion 134 in each case. An underside 135 of the module cover 110 is designed to be predominantly planar between the first cooling rib portion 133 and the second cooling rib portion 134. Compared to the second cooling rib portion 134, the cooling ribs 114 of the first cooling rib portion 133 are designed to be shorter in the y direction and in the z direction owing to the recess 137.

In the embodiment, the module cover 110 extends over the entire width of the module housing 501, between the third fastening portion 590 and the fourth fastening portion 591, in the y direction and ends in alignment with the third lateral face 36. The module cover 110 can also be designed to be shorter in they direction than an extent of the module housing 501 in they direction, so that the module cover 110 and the module housing 501 form a step laterally. Furthermore, the stator module 2 can consequently also be supported via a cross member of the carrier device 4. The carrier device 4 can also be designed as a solid plate with recesses.

At the housing base 520, the connection module 100 is fastened to the housing base 520 by a second fastener, which is designed, for example, as a screw or a combination of a threaded pin and screw. The module cover 110 is also fastened to the housing base 520 by a third fastener. The third fastener can be a screw.

The third interior space 118 can be potted with a first potting compound 143. The first potting compound 143 can also be referred to in general as further potting compound 143. It is also possible to dispense with the potting of the third interior space 118. The first potting compound 143 is designed to be electrically non-conducting, but heat conducting. The first potting compound 143 preferably comprises, amongst other things, at least one of the following first materials: matrix material, thermosetting plastic, epoxy plastic, particle material, particle material embedded in the matrix material, polyurethane, a two-component system based on a resin and a hardener. The first potting compound 143 has a first heat conduction coefficient. The first heat conduction coefficient is preferably between 0.5 and 0.7 W/m*K, preferably 0.6 W/m*K.

The third interior space 118 is preferably potted completely with the first potting compound 143 so that the connection module 100 is embedded in the first potting compound 143. The first potting compound 143 thermally couples the connection module 100 to the module cover 110. The module cover 110 comprises a heat-conducting material, preferably one of the following second materials: metal, heat-conductive ceramic, heat-conductive plastic, aluminum.

The connection module 100 is connectable to an electrical energy source, for example to an energy supply network, via the energy supply line 10. Electrical energy is provided during operation of the planar actuator system 1 via the energy supply line 10. At the primary side, the electrical energy source, for example, can provide the electrical energy as a single-phase or multi-phase, in particular tri-phase, alternating voltage, for example. The electrical energy source can also provide a direct voltage. The phases of the alternating voltage can each have a voltage effective value of 230V and a frequency of 50 Hz. The connection module 100 is designed to generate a drive energy and a supply energy from electrical energy of the electrical energy source.

The connection module 100 is designed such that, at the secondary side of the contact unit 121, 122, the connection module 100 provides the drive energy as a direct voltage and/or a direct current. To this end, the connection module 100 can comprise one or more rectifiers and/or an AC/DC power adapter. In particular, the connection module 100 can be designed to provide the drive energy at the secondary side as a direct voltage of no more than 150V, in particular no more than 120V, in particular no more than 60V. The supply energy can be provided as a direct voltage with a voltage of no more than 10V, in particular with a voltage of 6V to 7V, for example with a voltage of 7V.

With the conversion of the electrical energy provided at the primary side to the drive energy provided at the secondary side, the connection module 100 becomes heated due to resistance losses and generates a first heat $W_1$. If the connection module 100 is potted in the first potting compound 143, the connection module 100 transfers the first heat $W_1$ to the first potting compound 143. The first potting compound 143 passes the first heat $W_1$ to the module cover 110. As a result of the heat-conducting second material of the module cover 110, the module cover 110 is heated substantially uniformly from the third interior space 118 outwards.

Upon the activation of the first fan 112, this extracts air 139 from the environment 48 at the underside and guides it from below to the underside 135 of the module cover 110. As a result of providing a gap between a fan frame of the first fan 112 and the underside 135 of the module cover 110, the air 139 can be diverted at the underside 135 of the module cover 110 such that the air 139 flows along the underside 135 of the module cover 110 in the direction of the cooling ribs 114 and along the cooling ribs 114. In this case, the air 139 absorbs a first proportion of the first heat $W_1$ from the module cover 110 so that the connection module 100 in the third interior space 118 is reliably cooled and overheating of the connection module 100 can be reliably prevented.

In addition, with a thermal coupling of the first and second carrier-element lateral face 115, 116 of the first and second carrier element 40, 41 to the module cover 110, a second proportion of the first heat $W_1$ can also be transferred from the module cover 110 to the first and second carrier element 40, 41.

Alternatively, it would also be conceivable to dispense with the first potting compound 143. In addition, at least one entry opening and one exit opening can be provided in the module cover 110, which fluidically connect the environment 48 to the third interior space 118. In this case, the entry opening can be arranged above the first fan 112 and the exit opening can be arranged, for example, in the region of the cooling rib structure 113. In this case, the first fan 112, upon activation, delivers part of the air 139 directly into the third interior space 118 in which the air 139 flows around the connection module 100 and thereby absorbs the first heat $W_1$. The heated air 139 exits the third interior space 118 via the exit opening.

Figure 6:
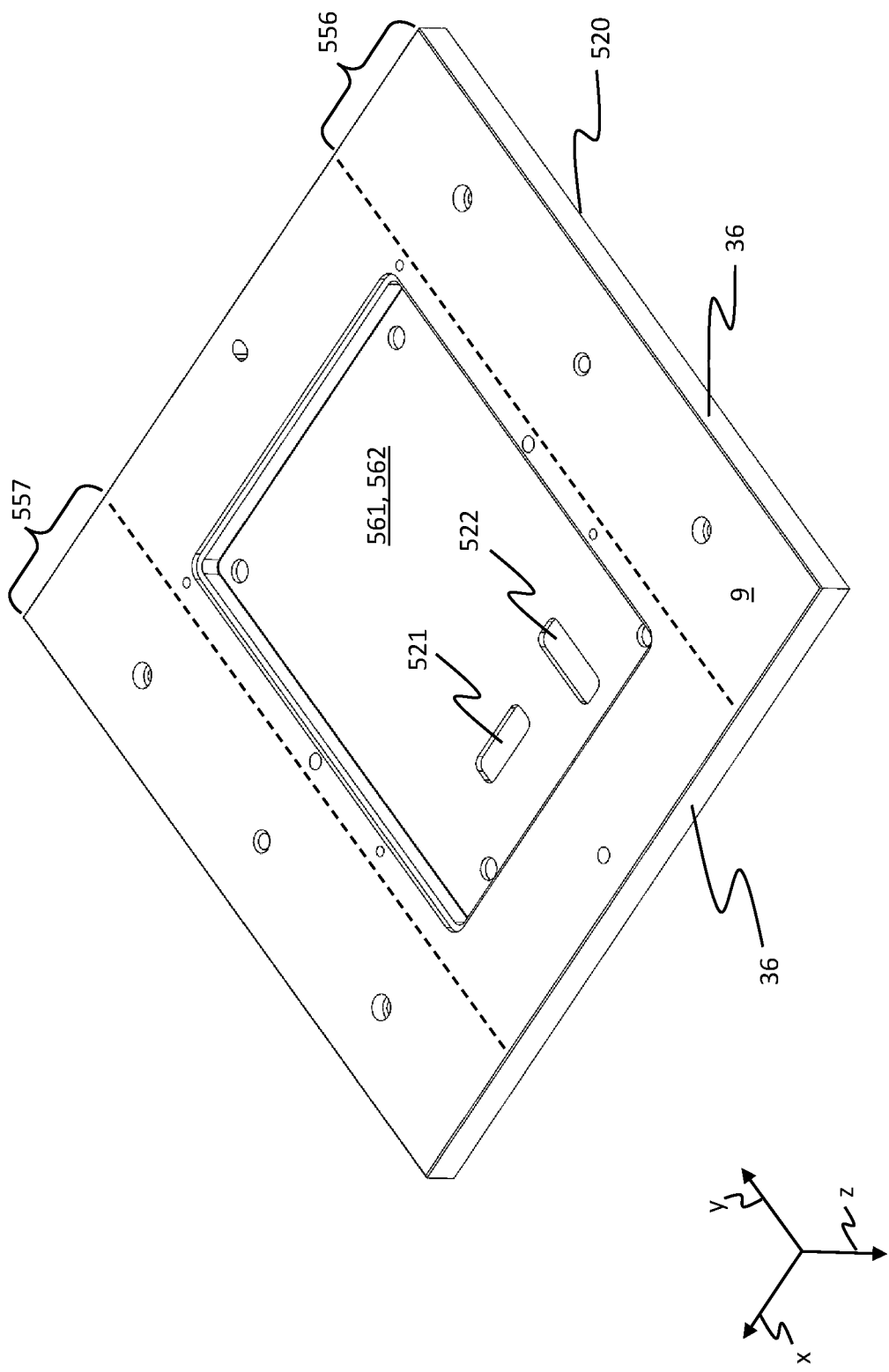
FIG. 6 shows a perspective illustration of a housing base of the stator module shown in FIGS. 1 to 5, with the housing base viewed from below.

FIG. 6 shows a perspective illustration of the housing base 520 of the stator module shown in FIGS. 1 to 5, with the housing base 520 viewed from below.

The housing base 520 is designed in the form of a plate. In this case, the housing base 520 is designed to be considerably narrower in the z direction than in the x and y direction. The housing base 520 comprises at least one of the following thermally conductive third materials: metal, heat-conductive ceramic, heat-conductive plastic, aluminum. The third material can be identical to the second material of the module cover 110 illustrated in FIG. 2.

To increase the third interior space 118, a second recess 561 is provided in the housing base 520. The second recess 561 is designed in the form of a rectangle in a view from below and the connection module lies partially in the second recess 561. The second recess 561 is positioned substantially centrally in the housing base 520 in the x and y direction. The second recess 561 has a second recess base 562. The second recess base 562 spatially separates the third interior space 118 from the second interior space. In this case, the second recess base 562 serves substantially to shield the connection module from the sensor module. In addition, a further proportion of the first heat can be dissipated from the connection module at the upper side via the second recess base 562, so that the connection module can be reliably cooled at both sides via the housing base 520 and the module cover. In this case, the dissipated proportion of the first heat $W_1$ illustrated in FIG. 5 can be conducted outwards to the fastening portion 556, 557 via the second recess base 562.

The second recess 561 is arranged between the first fastening portion 556 and the second fastening portion 557 in the x direction. In this case, the second recess 561 is designed to be narrower in the y direction than the housing base 520. The housing base 520 consequently has an uninterrupted face of the module underside 9 extending circumferentially around the second recess 561. In the assembled state of the stator module, the module underside 9 is covered by the module cover, in particular by the cooling rib structure 113 illustrated in FIG. 2, in a region between the second recess 561 and the third lateral face 36 in the transverse direction and between the first fastening portion 556 and the second fastening portion 557.

A first connecting opening 521 and a second connecting opening 522 are furthermore arranged in the second recess base 562. The first connecting opening 521 and the second connecting opening 522 are arranged offset from one another. The connecting openings 521, 522 are designed in the form of an elongated hole and fluidically connect the third interior space 118 to the second interior space 560. The first connecting opening 521 is designed to correspond to the first contact unit 121 illustrated in FIG. 3 and the second connecting opening 522 is designed to correspond to the second contact unit 122 illustrated in FIG. 3. In the assembled state of the stator module, the first contact unit 121 reaches through the first connecting opening 521 and the second contact unit 122 reaches through the second contact opening 522.

Figure 7:
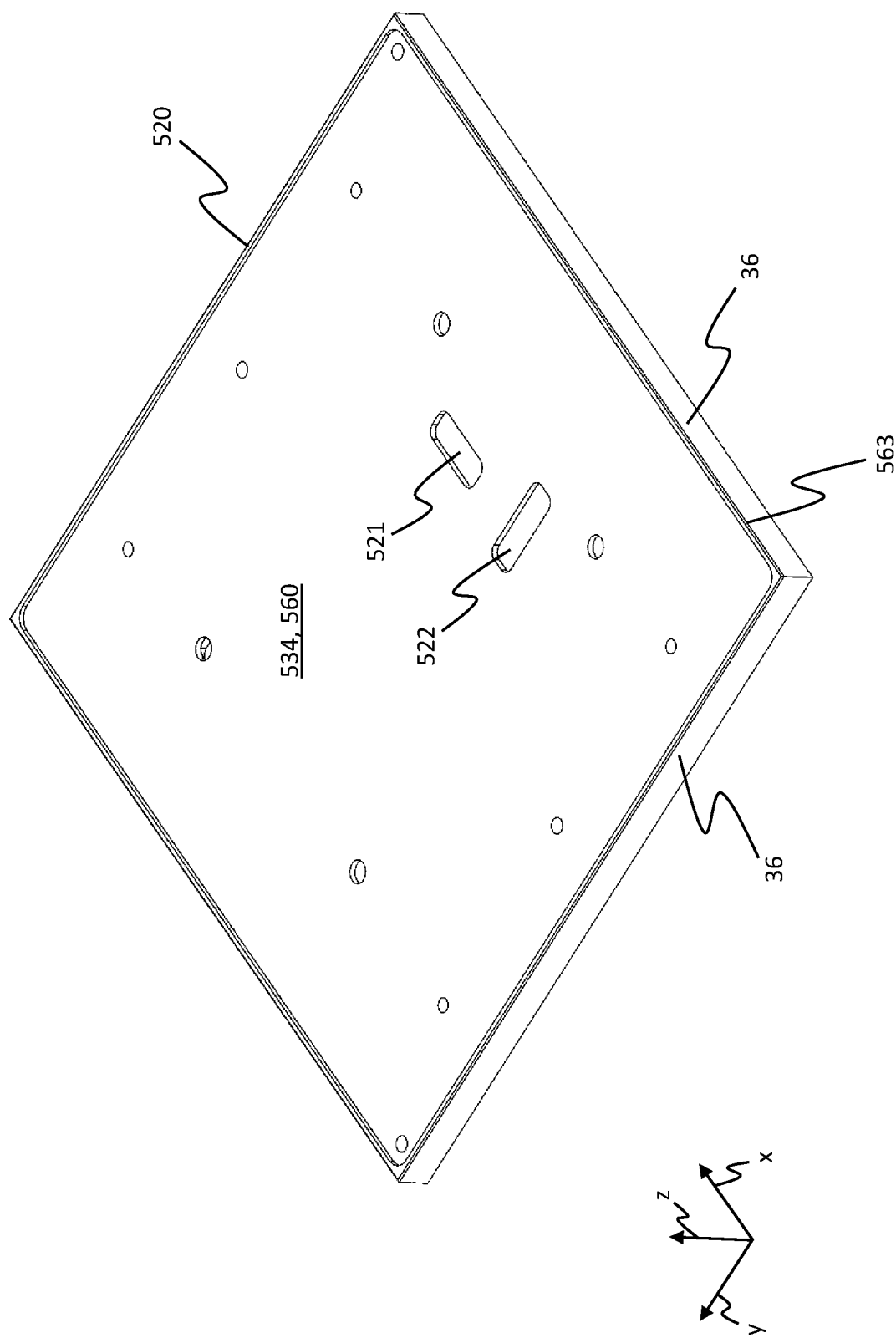
FIG. 7 shows perspective illustration of the housing base shown in FIG. 6, with the housing base viewed from above.

FIG. 7 shows a perspective illustration of the housing base 520, with the housing base 520 viewed from above.

The housing base 520 has, on a side facing the stator unit 400, a substantially planar configuration of a housing base upper side 534. The housing base upper side 534 in this case is arranged perpendicularly to the third lateral face 36 and extends, by way of example, in an xy plane. Externally, the housing base 520 can have a first edge 563. The first edge 563 adjoins the third lateral face 36 of the housing base 520. In this case, the first edge 563 projects over the housing-base upper side 534. The housing-base upper side 534 is enclosed circumferentially by the first edge 563. The connecting opening 521, 522 leads to the housing-base upper side 534. The housing-base upper side 534 delimits the second interior space 560 on a side facing the stator unit 400.

Figure 8:
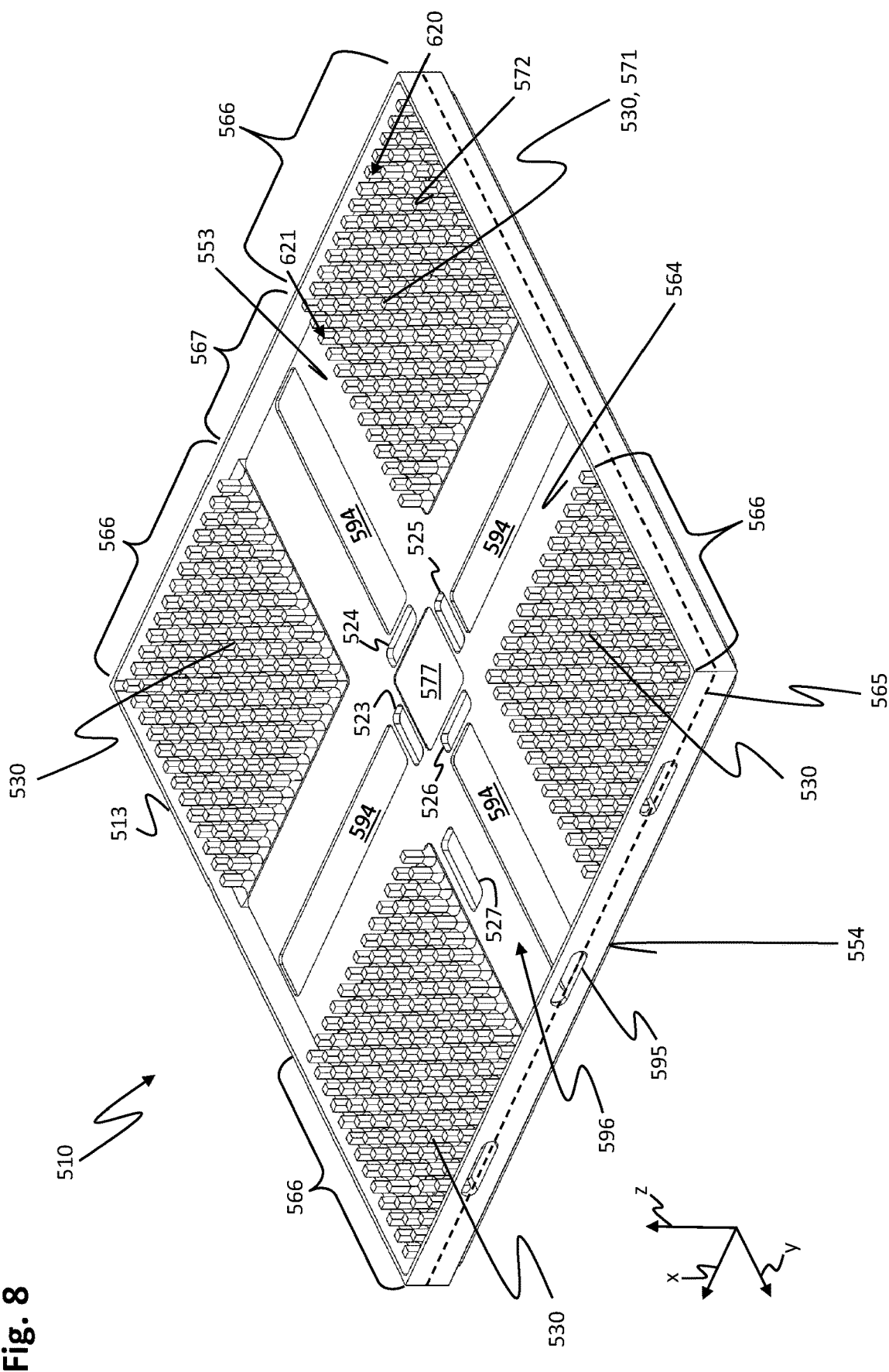
FIG. 8 shows a perspective illustration of a housing cover of the stator module shown in FIGS. 1 to 5, with the housing cover viewed from above.

FIG. 8 shows a perspective illustration of the housing cover 510 of the stator module 2 shown in FIGS. 1 to 5, with the housing cover 510 viewed from above.

The housing cover 510 has a second edge 513 and a cover portion 565 at the upper side. The second edge 513 is also referred to in general as edge 513. The cover portion 565 is designed in the form of a plate and extends in an xy plane. In this case, the cover portion 565, up to the second edge 513, occupies the entire width in the x and y direction of the housing cover 510. The second edge 513 is arranged at the cover portion 565 on a side facing the stator unit 400. The second edge 513 is preferably arranged perpendicularly to the cover portion 565 and is designed to extend circumferentially along the cover portion 565. The second edge 513 extends in the direction of the stator unit. The second edge 513 delimits the first interior space 564 together with the cover portion 565.

The housing cover 510 has, on the side facing the stator unit, a first housing portion 566 and a second housing portion 567. The first housing portion 566 is delimited internally by the second housing portion 567 designed in the form of a cross. The first housing portion 566 is delimited externally by the second edge 513. In plan view, the first housing portion 566 is divided into four regions of extent designed in the form of a square. The first housing portion 566 has a first heat-conducting structure 530. The second housing portion 567 is free of the first heat-conducting structure 530 and therefore has a substantially planar configuration at the cover upper side 553.

The first heat-conducting structure 530 has a plurality of individual first heat-conducting elements 571 in each case, which are arranged at a spacing from one another in a regular pattern. For example, the first heat-conducting structure 530 has a plurality of first rows 620 extending in the x direction, each with a plurality of first heat-conducting elements 571—thirteen first heat-conducting elements 571 in FIG. 8—which are arranged at a spacing from one another on the cover portion 565 in one of the first rows 620 in each case. The first heat-conducting structure 530 furthermore has a plurality of second rows 621, extending in the y direction, of a plurality of first heat-conducting elements 571—thirteen first heat-conducting elements 571 in FIG. 8—which are arranged at a spacing from one another on the cover portion 565 in one of the second rows 621 in each case. In this case, the first heat-conducting elements 571 are arranged in a matrix of n first rows 620 and m second rows

621. The first rows 620 are arranged perpendicularly to the second rows 621, wherein the number n, m of the rows 620, 621 can be freely selected in each case, but is advantageously identical.

Each of the first heat-conducting elements 571 is designed in the form of a pin and is designed to be longer in the z direction than the first heat-conducting element 571 extends in the x or y direction. On the side facing away from the stator unit, each of the first heat-conducting elements 571 is integrally connected to the cover portion 565, in particular in one piece. On a side facing the stator unit, each of the heat-conducting elements 571 has a first contact face 572. The first contact faces 572 of all first heat-conducting elements 571 each extend in a common plane, which, in the embodiment, is formed by way of example as an xy plane. In this case, the first contact face 572 ends in the same plane as the first edge 513. In the assembled state, the first contact face 572 abuts against the stator unit at the underside. In the embodiment, the first heat-conducting element 571 has, by way of example, a substantially square cross-section with a section in the vicinity of the first contact face 572 in an xy plane. The first heat-conducting element 571 has a cross-sectional area with a first surface area. By providing a plurality of first heat-conducting elements 571 which are arranged at a spacing from one another, an eddy current in the first heat-conducting structure 530 is kept low, so that heating of the first heat-conducting structure 530 as a result of eddy currents can be reliably prevented. To prevent the first heat-conducting element 571 from breaking off the cover portion 565, the first heat-conducting element 571 can be designed to be wider at the bottom.

The housing cover 510 comprises at least one of the following thermally conductive fourth materials: metal, heat-conductive ceramic, heat-conductive plastic, aluminum. The fourth material can be identical to the second material of the module cover and/or the housing base. This is particularly advantageous when the housing cover 510 and/or the housing base and/or the module cover each comprises an identical metallic second, third and fourth material. This prevents a potential difference of a standard electrode potential in an electrochemical series between the second to fourth material. By preventing the potential difference, a redox system is not formed between the module cover and/or the housing base and/or the housing cover 510, so that electrochemical corrosion based on the potential difference between the second to fourth material can be prevented.

In the embodiment, a first receptacle 594 is provided in the second housing portion 567, arranged respectively to form a cross, which first receptacle likewise extends centrally with respect to the extent of the housing cover 510 in the x direction or y direction. The first receptacle 594 is designed to be elongated and rectangular in plan view.

In a central position, the cover portion 565 furthermore has a second receptacle 577. The second receptacle 577 has a substantially square configuration in plan view. In this case, a third to sixth connecting opening 523, 524, 525, 526 is arranged in each case between a lateral edge of the second receptacle 577 and the first receptacle 594. A seventh connecting opening 527 is arranged in the second housing portion 567, between one of the first receptacles 594 and the first housing portion 566. The third to seventh connecting opening 523, 524, 525, 526, 527 fluidically connects the first interior space 564 to the second interior space.

In a modification of the embodiment shown in FIG. 8, the first heat-conducting structure 530 can also be designed as an individual square for each first, third, fourth and fifth housing portion 566, 568, 569, 570. The first heat-conducting structure 530 can also comprise only a single square heat-conducting element 571, which extends over the entire first housing portion 566 in the xy direction. This configuration is particularly suitable for housing covers 510 made from a non-magnetizable material.

Alternatively to the configuration, shown in FIG. 8, of the first heat-conducting element 571, the first heat-conducting element 571 can also have a circular, rhomboidal or polygonal first contact face 572, with which the first heat-conducting element 571 abuts against the stator unit at the underside.

Alternatively to the configuration, shown in FIG. 8, of the first heat-conducting structure 530 with the first heat-conducting element 571 designed in the form of a pin, it would also be conceivable for the first heat-conducting structure 530 to have a honeycomb pattern, so that the first heat-conducting element 571 is connected to the next first heat-conducting element 571 at individual sides, but, at the other faces, is arranged at a spacing from the first heat-conducting element 571 arranged opposite. A grid structure comprising crossed webs or similar structures of adjacently arranged first heat-conducting elements 571 would also be conceivable. It would also be conceivable for the first heat-conducting structure 530 to be made from a foamed material, for example an aluminum foam. An irregular pattern for the arrangement of the first heat-conducting element 571 would also be conceivable.

In the embodiment, a fill opening 595 is additionally provided in the second edge 513. The fill opening 595 serves for filling the first interior space 564 with a second potting compound 596 via the fill opening 595, and embedding the power module 300 in the second potting compound 596, during the assembly of the stator module, after the power module 300 has been arranged in the second housing portion 567 and the housing cover 510 has been assembled on the stator unit 400. The second potting compound 596 can be referred to in general as potting compound 596.

The second potting compound 596 is preferably designed to be electrically insulating and thermally conducting. The second potting compound 596 preferably comprises one of the following fifth materials: matrix material, thermosetting plastic, epoxy plastic, particle material embedded in the matrix material, polyurethane, a two-component system based on a resin and a hardener. The first material and the fifth material are preferably identical. The second potting compound 596 has a second heat-conduction coefficient. The second heat-conduction coefficient is between 0.5 and 0.7 W/m*K, preferably 0.6 W/m*K.

The second potting compound 596 has the advantage that moisture is prevented from penetrating into the power module 300. It is furthermore ensured that good thermal bonding between the housing cover 510 and the stator unit 400 is ensured. By providing the first heat-conducting structure 530 on a side facing the stator unit 400 and filling a potting space between the individual first heat-conducting elements 571 with the non-magnetic second potting compound 596, an eddy current in the housing cover 510, in particular in the region of the first heat-conducting structure 530, can be kept particularly low, so that heating of the housing cover 510 as a result of eddy current influences can be reliably prevented.

As a result of the thermally conductive configuration of the second potting compound 596, a good, reliable thermal bonding is furthermore provided between the stator unit 400 and the housing cover 510 in addition to the first heat-conducting structure 530.

Figure 9:
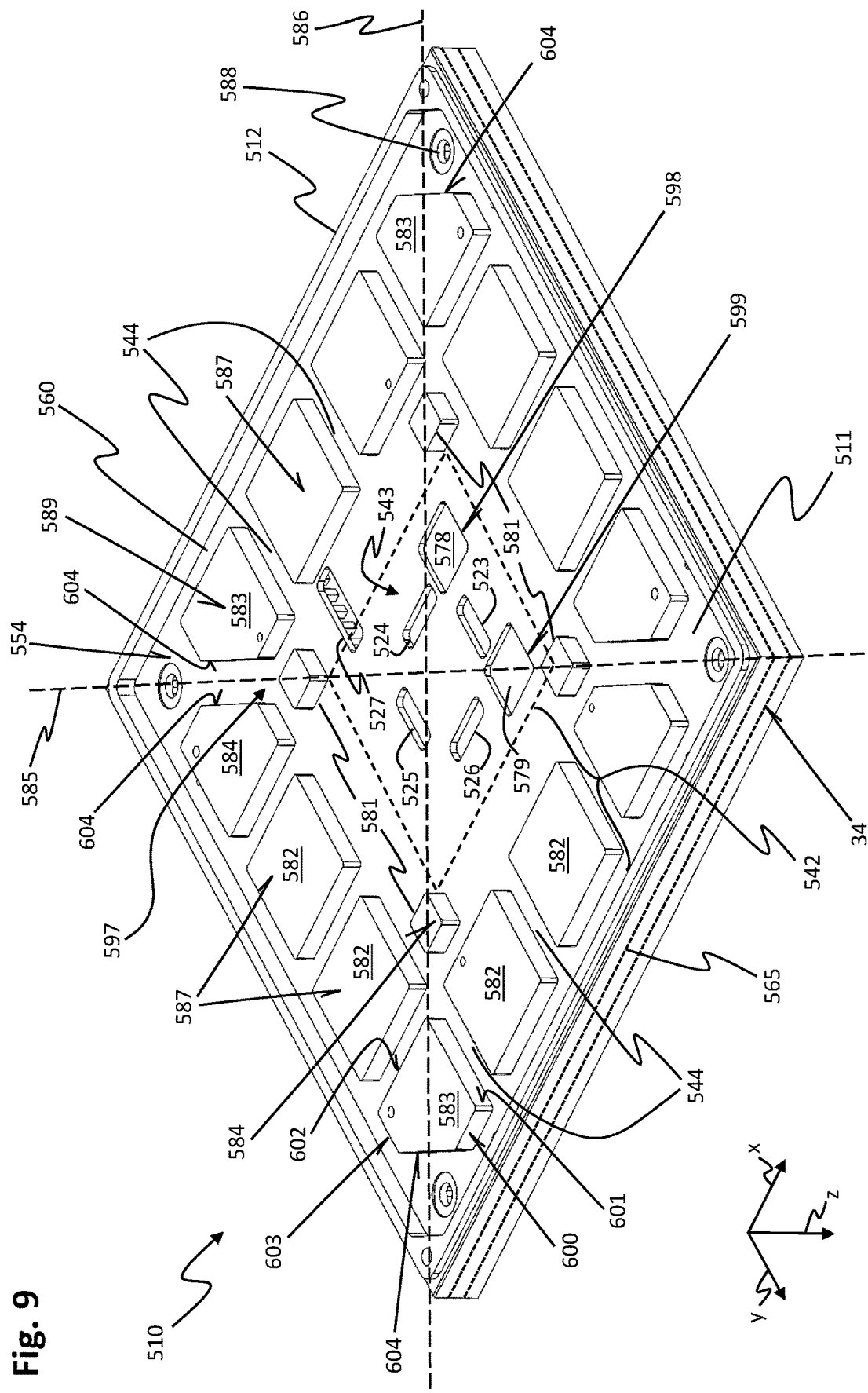
FIG. 9 shows a perspective illustration of the housing cover shown in FIG. 8, with the housing cover viewed from below.

FIG. 9 shows a perspective illustration of the housing cover 510, with the housing cover 510 viewed from below.

The housing cover 510 has, at the cover underside 554, a third edge 512, a third recess 511, a first center region 543 and second heat-conducting structure 542.

In general, the first center region 543 can also be referred to as center region. The third edge 512 can furthermore also be referred to in general as further edge 512.

The third edge 512 is arranged inwardly offset (in the x and y direction) from the second lateral face 34 of the housing cover 510 and is formed circumferentially. The third edge 512 extends in the direction of the housing base. An outside of the third edge 512 is designed to correspond to an inside of the first edge 563 illustrated in FIG. 7 so that, as the module housing 501 is closed, the first edge 563 reaches around the outside of the third edge 512. The third edge 512 therefore delimits the second interior space 560 circumferentially (in the xy direction).

Alternatively to the offset arrangement of the third edge 512 with respect to the second lateral face 34, the third edge 512 can, however, also be aligned flush with the second lateral face 34 and the third edge 512 can reach circumferentially around the first edge 563. A spaced arrangement of the first edge 563 and the third edge 512 in the x and/or y direction is also conceivable.

The third edge 512 delimits the third recess 511 circumferentially. In the view from below, the third recess 511 has a substantially rectangular, preferably square, configuration. The second heat-conducting structure 542 and the first center region 543 of the housing cover 510 are arranged in the third recess 511. The second heat-conducting structure 542 adjoins the third edge 512 internally. The second heat-conducting structure 542 is arranged circumferentially around the first center region 543, which adjoins the second heat-conducting structure 542 internally.

The third recess 511 has a third recess base. The third recess base is designed to be flat in the first center region 543 and extends in an xy plane. The third to seventh connecting openings 523 to 527 are arranged in the first center region 543. The third to seventh connection openings 523 to 527 are designed as through-openings and connect the first interior space to the second interior space 560. The third to seventh connecting opening 523 to 527 can be designed in the form of an elongated hole in each case. In this case, the third to sixth connecting opening 523 to 526 is inclined, preferably perpendicularly, to the next third to sixth connecting opening 523 to 526 in each case. The third to seventh connecting openings 523 to 526 are arranged around a center of the housing cover 510.

At least one first processing-unit receptacle 578 and a second processing-unit receptacle 579 can furthermore be arranged in the first center region 543. The first and second processing-unit receptacles 578, 579 are designed identically to one another and have a square configuration in the view from below. The processing-unit receptacles 578, 579 are designed as an indentation in the housing cover 510, so that the processing-unit receptacle 578, 579 is designed such that it is closed at the upper side (shown at the underside in FIG. 9 owing to the housing cover 510 being viewed from below).

The first processing-unit receptacle 578 has a first receptacle base 598 and the second processing-unit receptacle 579 has a second receptacle base 599. The first receptacle base 598 and the second receptacle base 599 are arranged such that they extend in a common xy plane. The first receptacle base 598 and the second receptacle base 599 are aligned parallel to the module upper side 8 and the third recess base.

The third connecting opening 523 can be arranged between the first processing-unit receptacle 578 and the second processing-unit receptacle 579.

The second heat-conducting structure 542 has at least one second heat-conducting element 581, by way of example a third heat-conducting element 582 and a fourth heat-conducting element 583.

In the view from below, the second heat-conducting element 581 has rectangular, in particular a substantially square, configuration, wherein an extent in the x and y direction is greater than an extent in the z direction. The second heat-conducting element 581 has a second contact face 584 at the underside. The second contact face 584 is designed to be planar and is parallel to the module upper side 8. In the embodiment, four second heat-conducting elements 581 are provided by way of example, wherein the second heat-conducting elements 581 delimit the first center region 543 by means of an inner corner. In this case, the second heat-conducting elements 581 are arranged so that the first center region 543 has a rectangular, preferably square, configuration in the view from below. Therefore, each of the second heat-conducting elements 581 is arranged at the same spacing from the respectively adjacent next second heat-conducting element 581 arranged in the x or y direction. In this case, two second heat-conducting elements 581 in each case are arranged on a diagonal 585, 586 of the housing cover 510.

The second contact face 584 has a second surface area. The second surface area is considerably greater (for example by a factor of 2 to 20) than the first surface area of the first contact face.

The third heat-conducting element 582 and the fourth heat-conducting element 583 are arranged externally with respect to the second heat-conducting element 581, between the third edge 512 and the second heat-conducting element 581.

The third heat-conducting element 582 has a substantially rectangular, preferably square, configuration in the view from below. The third heat-conducting element 582 has a third contact face 587 at the underside. The third contact face 587 is designed to be planar and is arranged in a common plane with the second contact face 584. The third contact face has a third surface area. The third surface area is considerably greater (for example by a factor of 2 to 10) than the second surface area.

The fourth heat-conducting element 583 has a substantially pentagonal configuration in the view from below. The fourth heat-conducting element 583 has a fourth contact face 589 at the underside. The fourth contact face 589 is designed to be planar and is arranged in a common plane with the second contact face 584 and the third contact face 587. The fourth contact face 589 has a fourth surface area. The third surface area is greater (for example by a factor of 1.1 to 2) than the fourth surface area. In the closed state of the module housing 501, the second contact face 584, the third contact face 587 and the fourth contact face 589 abut against the housing-base upper side 534. As a result of the abutting arrangement, the housing base 520 is thermally coupled to the second heat-conducting structure 542.

The fourth heat-conducting element 583 has a first to fifth heat-conducting-element lateral face 600 to 604. The first to fourth heat-conducting-element lateral face 600 to 603 is arranged perpendicularly to the next heat-conducting-element lateral face 600 to 603. The fifth heat-conducting-element lateral face 604 connects the fourth heat-conducting-element lateral face 603 to the first heat-conducting-element lateral face 600 and is inclined at an angle, preferably at a 45° angle, to the first heat-conducting-element lateral face 600 and the fourth heat-conducting-element lateral face 603.

A plurality of third heat-conducting elements 582 are arranged in the circumferential direction (x or y direction) between the fourth heat-conducting elements 583. In the embodiment, for example, two third heat-conducting elements 582 are arranged in each case between two fourth heat-conducting elements 583.

A first intermediate space 544 is arranged in each case between the third and fourth heat-conducting element 582, 583 and between two adjacently arranged third heat-conducting elements 582. The first intermediate space 544 can be designed in the manner of a groove. In its main direction of extent, the first intermediate space 544 extends either in the x direction or in the y direction and is delimited externally by the third edge 512. In the main direction of extent of the first intermediate space 544, the third heat-conducting element 582 or the fourth heat-conducting element 583 is arranged in alignment with, and opposite, the first intermediate space 544, in a central position with respect thereto (transversely to the main direction of extent of the first intermediate space 544).

A plurality of third and fourth heat-conducting elements 582, 583 is provided in the embodiment. In this case, two fourth heat-conducting elements 583 each adjoin a first diagonal 585 at a spacing. The fourth heat-conducting element 583 is aligned such that it is rotated with respect to the first diagonal 585 such that the fifth heat-conducting-element lateral face 604 faces the first diagonal 585 and the fifth heat-conducting-element lateral face 604 is aligned parallel to the first diagonal 585. A second intermediate space 597 between the two fourth heat-conducting elements 583 at the first diagonal 585 consequently has a constant width and extends along the first diagonal 585. The second intermediate space 597 leads internally to the second heat-conducting element 581, which is arranged directly on the first diagonal 585 such that, in the view from below, the second heat-conducting element 581 is divided into two equally sized right-angled triangles by the first diagonal 585.

Two further fourth heat-conducting elements 583 are arranged in each case opposite one another on a second diagonal 586, rotated such that the fifth heat-conducting-element lateral face 604 is directed outwards to the third edge 512 and the fifth heat-conducting-element lateral face 604 is aligned perpendicularly to the second diagonal 586. The second diagonal 586 extends centrally through the two fourth heat-conducting elements 583. Sufficient installation space is consequently provided between the fifth heat-conducting-element lateral face 604 and the third edge 512 for arranging a connecting passage 588 for guiding a fourth fastener through the housing cover 510.

It is particularly advantageous if the second heat-conducting structure 542 has a constant width in the xy direction and comprises more than 50%, in particular more than 75%, in particular more than 85% of a total area of the housing cover 510 in the x and y direction. It is particularly advantageous if the first center region 543 is selected to be as small as possible to ensure reliable heat transfer between the housing cover 510 and the housing base 520.

Figure 10:
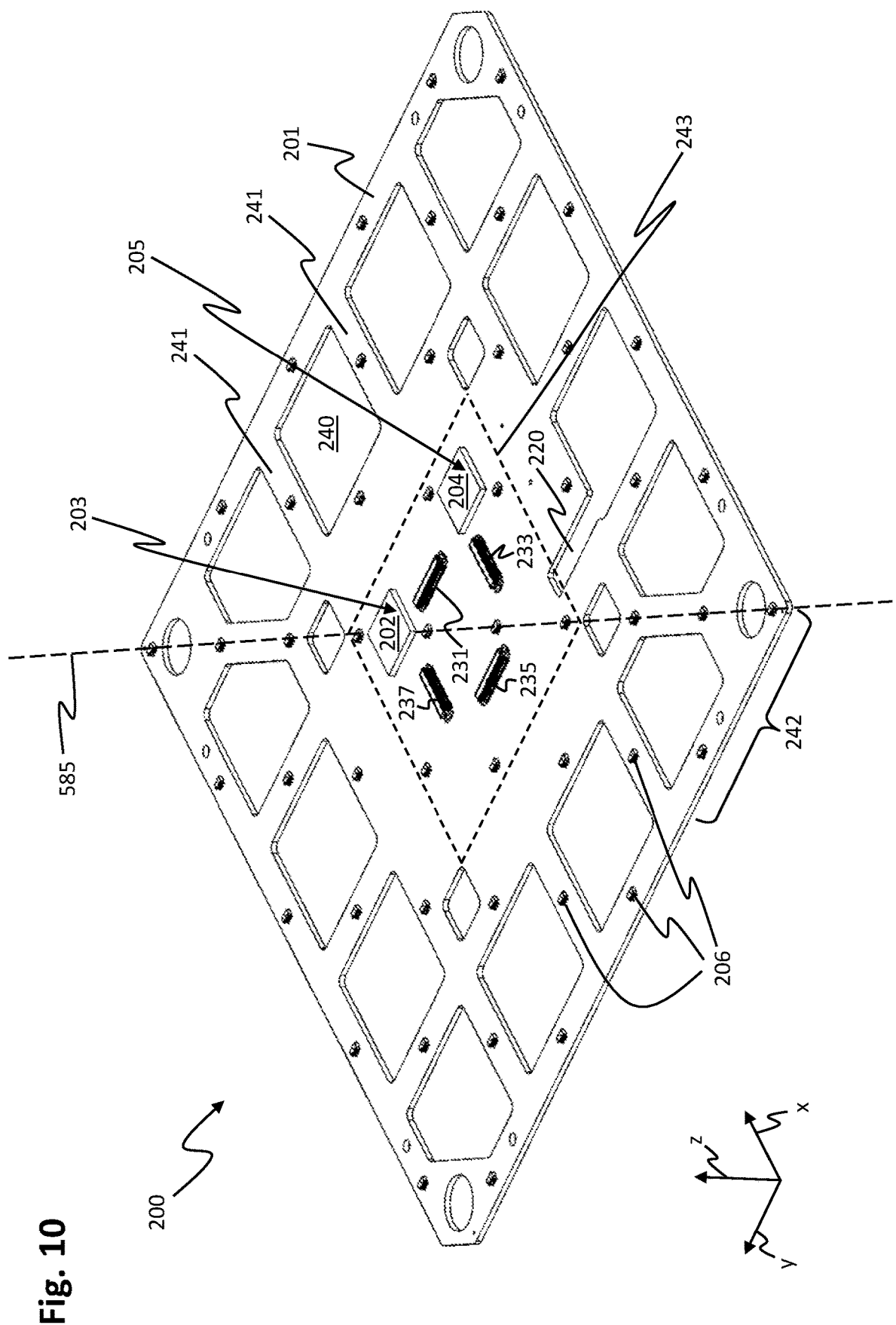
FIG. 10 shows a perspective illustration of a sensor module shown in FIGS. 3 and 4, with the sensor module viewed from above.

FIG. 10 shows a perspective illustration, with the sensor module 200 viewed from above.

The sensor module 200 has a first printed circuit board 201, a first processing unit 202 and a second processing unit 204, arranged at a spacing from the first processing unit 202. The first printed circuit board 201 can be also be referred to in general as printed circuit board 201. The sensor module 200 furthermore comprises a plurality of position-detection units 206, which are arranged at an upper side of the first printed circuit board 201, which can be designed to be elastic. The first processing unit 202 and the second processing unit 204 are electrically connected to one another by the first printed circuit board 201. Furthermore, the first printed circuit board 201 connects the position-detection units 206 to the processing units 202, 204.

The position-detection units 206 can be arranged in a regular pattern at the upper side of the first printed circuit board 201 and/or at the underside of the first printed circuit board 201. The position-detection units 206 can also be designed such that they are integrated in the first printed circuit board 201. In particular, the pattern can be selected such that the position-detection units 206 are at a uniform spacing from one another.

The position-detection units 206 are designed to detect a position of the moving body 20 over the stator unit 400 in order to generate a sensor signal representing the position of the moving body 20. In particular, the position-detection units 206 can be designed, for example, to detect a magnetic field of a magnet of the moving body 20. In this case, the magnet of the moving body 20 can be, for example, a drive magnet of the moving body 20. The position-detection unit 206 can be, for example, a magnetic field sensor, in particular a digital or analog Hall sensor. The position-detection unit 206 can also be designed to detect a spatial direction of the magnetic field of the magnet.

The sensor module 200 has, at the upper side of the first printed circuit board 201, a first to fourth coupling element 231, 233, 235, 237, wherein the first to fourth coupling element 231, 233, 235, 237 is part of a respective plug connection. The first to fourth coupling element 231, 233, 235, 237 is designed, by way of example, as a plug and reaches through the third to seventh connecting opening in the assembled state of the sensor module 200. In this case, the first to fourth coupling element 231, 233, 235, 237 engages in a mating element of the power module 300, which mating element is designed to correspond to the first to fourth coupling element 231, 233, 235, 237, and connects the power module 300 electrically to the sensor module 200. A gap between the third to sixth connecting opening and the first to fourth coupling element 231, 233, 234, 237 can be prevented by a seal so that the second potting compound cannot pass from the first interior space into the second interior space during the potting of the first interior space.

The sensor module 200 is electrically connected to the connection module. To this end, the sensor module 200 has, at the underside (shown in FIG. 4), a third contact unit 207, which is designed to correspond to the first contact unit 121 of the connection module and which engage in one another in order to connect the sensor module 200 electrically to the connection module. The third contact unit 207 can be designed as a plug unit. As shown in FIGS. 3 and 4, the third contact unit 207 is arranged opposite the first contact unit 121, so that the first and/or the third contact unit 121, 207 reach through the first connecting opening 521 in the housing base 520. In this case, the sensor module 200 is electrically connected from the connection module 100 to the data line 12, 14 via the first and third contact unit 121, 207.

The supply energy can be provided, for example, for operating the position-detection units 206 and/or the first and/or second processing unit 202, 204. The supply energy can be a direct voltage with a voltage of no more than 20 V, in particular with a voltage of 5 V to 15 V, for instance with a voltage of 10 V.

The first and second processing unit 202, 204 can be designed as an integrated circuit, for instance as a microprocessor, an FPGA or a microcontroller.

The processing unit 202, 204 is designed to read out, from the position-detection unit 206, the information obtained by the position-detection unit 206 relating to a position of the moving body 20. For example, the processing unit 202, 204 can have an input via which an information signal of the position-detection unit 206 can be read in. The processing unit 202, 204 can be designed to process the read-in sensor signal to provide communication data which are suitable for transmission via the data network connected to the stator module 2.

The first processing unit 202 has a first contact face 203 at the upper side and the second processing unit 204 has a second contact face 205 at the upper side. The first contact face 203 and the second contact face 205 can be arranged in a common xy plane. In the assembled state of the stator module, the first processing unit 202 engages in the first processing-unit receptacle, which is designed to correspond to the first processing unit 202. The second processing unit 204 engages in the second processing-unit receptacle, which is designed to correspond to the second processing unit 204.

Advantageously, the first contact face 203 abuts against the first receptacle base 598 and the second contact face 205 abuts against the second receptacle base 599, when, in regular operation, the first processing unit 202 and/or the second processing unit 204 is heated to a temperature which is greater than a temperature of the housing cover. As a result of the processing unit 202, 204 abutting against the receptacle base 598, 599, the processing unit 202, 204 can be thermally coupled to the housing cover 510 illustrated in FIG. 9, so that heat produced during operation of the processing unit 202, 204 is reliably dissipated from the processing unit 202, 204 into the housing cover 510, and overheating of the processing unit 202, 204 can be prevented. In this case, the heat emitted from the processing unit 202, 204 can be transferred from the housing cover 510 to the housing base 520 via the second heat-conducting structure 542.

Alternatively, the first receptacle base 598 and/or the second receptacle base 599 is arranged at a spacing from the associated contact face 203, 205. This configuration is, in particular, conceivable when the first processing unit 202 and/or second processing unit 204 is particularly energy-efficient and only generates a low amount of waste heat. Long tolerance chains in the stator module are additionally prevented.

Housing passages 240, designed to substantially correspond to the second heat-conducting structure, are provided in the first printed circuit board 201, wherein a first web 241 or a second web 266 is arranged respectively between two housing passages 240 in each case, which web separates the housing passages 240 from one another. In its main direction of extent, the first web 241 extends in the x direction or in the y direction. The second web 266 extends along the first diagonal 585. At least one position-detection unit 206 is arranged on the first web 241 and the second web 266.

The geometry of the housing passages 240 is designed to correspond to the second to fourth heat-conducting element 581 to 583 in each case. In the assembled state of the stator module 2, the second to fourth heat-conducting elements 581 to 583 reach through the respectively associated housing passages 240 so that the sensor module 200 is substantially uncoupled from the heat transfer of the housing cover 510 to the housing base 520 and a heat path (which will be discussed in detail in FIGS. 14 to 16) is kept short.

As a result of the corresponding configuration of the first printed circuit board 201 with respect to the second heat-conducting structure, an area of the first printed circuit board 201 can be kept particularly large so that sufficient space is available on the first printed circuit board 201 for arranging the position-detection units 206, in particular at the first web 241 and/or at the second web 266, and the first and/or second processing unit 202, 204. Furthermore, the position-detection units 206 can be arranged in the predefined pattern and, at the same time, a large total surface area of the second to fourth surface areas of the second to fourth contact face can be provided. By matching the geometry of the second heat-conducting structure and the pattern of the arrangement of the position-detection units 206 to one another, the position-detection units 206 can detect the moving body effectively and, at the same time, good heat transfer can be ensured between the housing cover and the housing base.

As a result of the corresponding configuration of the first printed circuit board 201, the housing passages 240 are arranged exclusively in an edge region 242 of the first printed circuit board 201, whilst there are no housing passages in a second center region 243 of the first printed circuit board 201. The edge region 242 of the first printed circuit board 201 surrounds the second center region 243 of the first printed circuit board 201 in the circumferential direction. The edge region 242 has approximately the same extent and positioning in the x and y direction as the second heat-conducting structure 542. The same also applies to the second center region 243 of the first printed circuit board 201 and the first center region 543 of the housing cover 510.

In addition, a connecting cutout 220 can be provided in the first printed circuit board 201. The connecting cutout 220 is designed as an aperture in the first printed circuit board 201. Externally, the connecting cutout 220 leads laterally in the y direction to a housing passage 240 for the third heat-conducting element. In the x direction, the connecting cutout 220 is arranged between the housing passages 240 for two second heat-conducting elements. As can be seen in FIGS. 3 and 4, the connecting cutout 220 is arranged over the second connecting opening 522 of the housing base 520, and over the second contact unit 122, in the z direction. In the assembled state of the stator module 2, the second contact unit 122 reaches through both the second connecting opening 522 and the connecting cutout.

As shown in FIGS. 3 and 4, it is particularly advantageous if an insulating layer 265 is additionally provided between the sensor module 200 and the housing cover 510 and abuts against the first printed circuit board. The insulating layer 265 electrically insulates the first printed circuit board 201 from the housing cover 510. In plan view, the insulating layer 265 is designed to be geometrically identical to the first printed circuit board. It is also possible to dispense with the insulating layer 265 if the housing cover is manufactured from an electrically non-conductive material.

Figure 11:
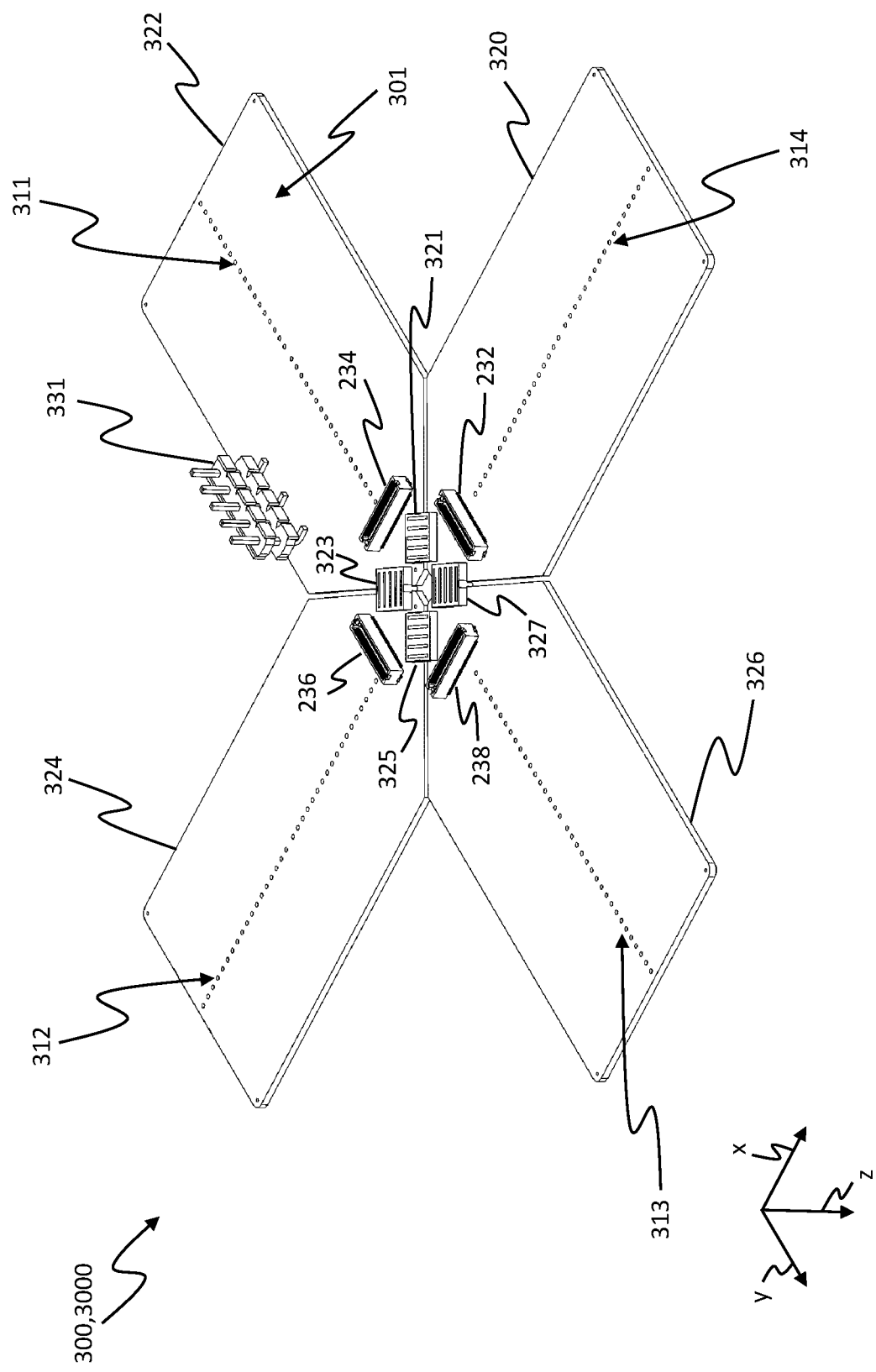
FIG. 11 shows a perspective illustration of a power module shown in FIGS. 3 and 4, with the power module viewed from below.

FIG. 11 show a perspective illustration, from below, of the power module 300 shown in FIGS. 3 and 4.

The power module 300 is designed to be substantially flat at its underside 301. The power module 300 has a base structure designed in the form of a cross, wherein a first to fourth mating element 232, 234, 236, 238 is provided internally, which, in the assembled state of the stator module, engages in the first to fourth coupling element 231, 233, 235, 237 shown in FIG. 10. The sensor module 200 is consequently electrically connected to the power module 300. In the assembled state of the power module 300, the underside 301 faces the cover upper side in the second housing portion. In the embodiment, the power module 300 is designed to be flatter in the z direction than the first heat-conducting structure, so that the first heat-conducting structure is guided laterally past the power module 300 in the assembled state of the power module 300 on the housing cover.

The power module 300 has a first module unit 320, a second module unit 322, a third module unit 324 and a fourth module unit 326. Unless any differences are described below, the first to fourth module units 320, 322, 324, 326 are designed identically to one another. The first module unit 320 and the third module unit 324 extend in the x direction in their main direction of extent, whilst, on the other hand, the second module unit 322 and the fourth module unit 326 extend in the y direction in their main direction of extent, so that the first to fourth module unit 320, 322, 324, 326 form the power module 300 in the shape of a cross. The first to fourth module units 320, 322, 324, 326 are connected to one another in an electrically conducting manner via connectors 321, 323, 325, 327. In addition, the connectors 321, 323, 325, 327 can be designed to connect the module units 320, 322, 324, 326 to one another in a mechanically rigid manner.

Each of the first to fourth module units 320, 322, 324, 326 has, in a central position in relation to a width transversely to the main direction of extent, a first to fourth contact structure 311, 312, 313, 314, which, in the embodiment, is designed by way of example as a socket contact structure. The first to fourth contact structure 311, 312, 313, 314 extends through the power module 300 in the z direction, so that the first to fourth contact structure 311, 312, 313, 314 can be contacted at the upper side.

The power module 300 is electrically connected to the connection module. To this end, the power module 300 has a fourth contact unit 311 at the underside, which is designed to correspond to the second contact unit. The second and fourth contact unit 331 engage in one another to connect the power module 300 electrically to the connection module. The fourth contact unit 331 can be designed as a plug unit, as shown in FIG. 11. As shown in FIGS. 3 and 4, the fourth contact unit 331 is arranged opposite the second contact unit 122, so that the second and/or the fourth contact unit 122, 331 reach through the second connecting opening 522 and the seventh connecting opening. In this case, the power module 300 is electrically supplied with the drive energy by the connection module via the second and fourth contact unit 122, 331.

Figure 12:
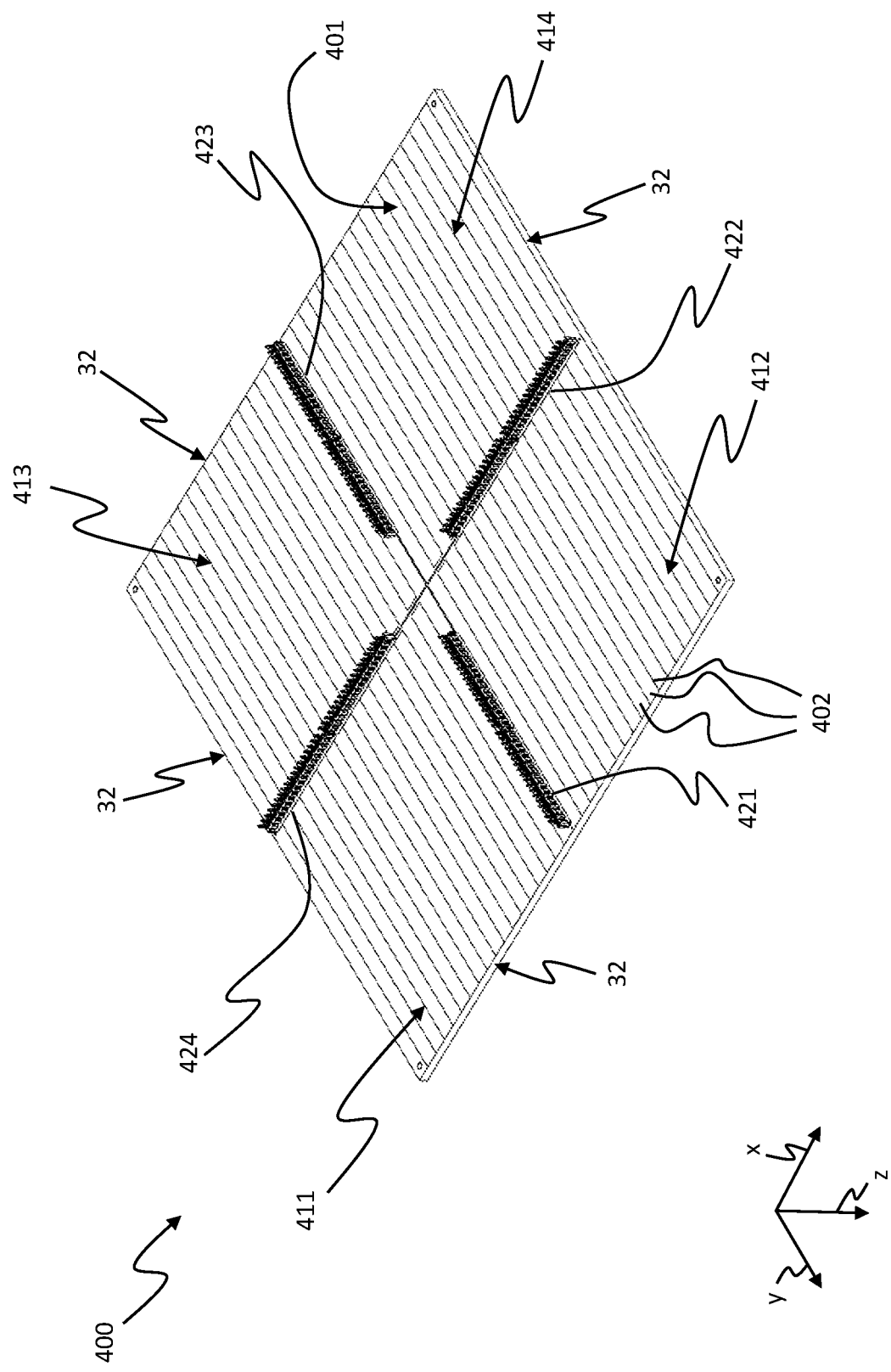
FIG. 12 shows a perspective illustration of the stator unit shown in FIGS. 3 and 4, with the stator unit viewed from below.

FIG. 12 shows a perspective illustration of the stator unit 400 shown in FIGS. 1 to 5, with the stator unit 400 viewed from below.

The stator unit 400 is designed as a square plate whereof the extent in the z direction is smaller than in the x and y direction. The stator unit 400 has a second printed circuit board 401, in particular a multilayered second printed circuit board 401. The second printed circuit board 401 comprises an insulating material. The second printed circuit board 401 furthermore has a plurality of coil conductors 402. The coil conductors 402 are designed as electrically conducting, in particular metallic, traces of the second printed circuit board 401. The traces can be arranged in several planes and aligned in different directions to one another. An individual coil conductor 402 can have a thickness (in the z direction) in each case of greater than 10 μm, in particular greater than 50 μm, in particular greater than 100 μm. The coil conductor 402 can additionally have a thickness of smaller than 1 mm, in particular smaller than 500 μm. In particular, the coil conductor 402 can have a thickness of 210 μm.

As a result of the multilayered configuration of the second printed circuit board 401, the stator unit 400 is designed to be particularly compact. Consequently, the second printed circuit board 401 furthermore comprises a high proportion of electrically conductive material. In the embodiment, a metal, preferably copper, is used as the electrically conductive material, so that the stator unit 400 as a whole has good thermal conductivity. Upon energization of an individual coil conductor 402 and an associated resistance loss, the energized coil conductor 402 becomes heated. This corresponds to a local heating of the stator unit 400. Starting from the local heating, the good thermal conductivity of the stator unit 400 causes the heat introduced into the stator unit 400 by the coil conductor 402 to disperse uniformly within the stator unit 400 so that the stator unit 400 is heated substantially uniformly in a—time-wise—efficient manner after the energization of one of the coil conductors 402, for example.

The stator unit 400 has a fifth to eighth contact structure 421, 422, 423, 424 at the underside. The fifth and seventh contact structure 421 and 423 extend in the y direction and are arranged in a central position in relation to the extent of the stator unit 400 in the x direction. The sixth and eighth contact structure 422, 424 are arranged in a central position relative to the extent of the stator unit 400 in the y direction and extend in the x direction. The fifth to eighth contact structure 421, 422, 423, 424 is therefore arranged in the form of a cross and can be designed as press-in connectors. In this case, in the assembled state of the stator unit 400 on the power module, the fifth to eighth contact structure 421 to 424 engages in the respectively associated first to fourth contact structure. This ensures an electrical and thermal contact between the stator unit 400 and the power module. The fifth to eighth contact structure 421 to 424 is furthermore electrically interconnected to the coil conductors 402.

The fifth to eighth contact structures 421, 422, 423, 424 divide the stator unit 400 into a first stator sector 411, a second stator sector 412, a third stator sector 413 and a fourth stator sector 414. Unless any differences are described below, the first to fourth stator sectors 411, 412, 413, 414 are constructed identically in each case. Each of the first to fourth stator sectors 411, 412, 413, 414 is laterally delimited externally in the x and y direction by the first lateral face 32 and internally by two of the fifth to eighth contact structures 421, 422, 423, 424 in each case. The first to fourth stator sectors 411, 412, 413, 414 in turn each comprise part of the elongated coil conductor 402. Each of the coil conductors 402 is arranged completely in one of the first to fourth stator sectors 411, 412, 413, 414.

Figure 13:
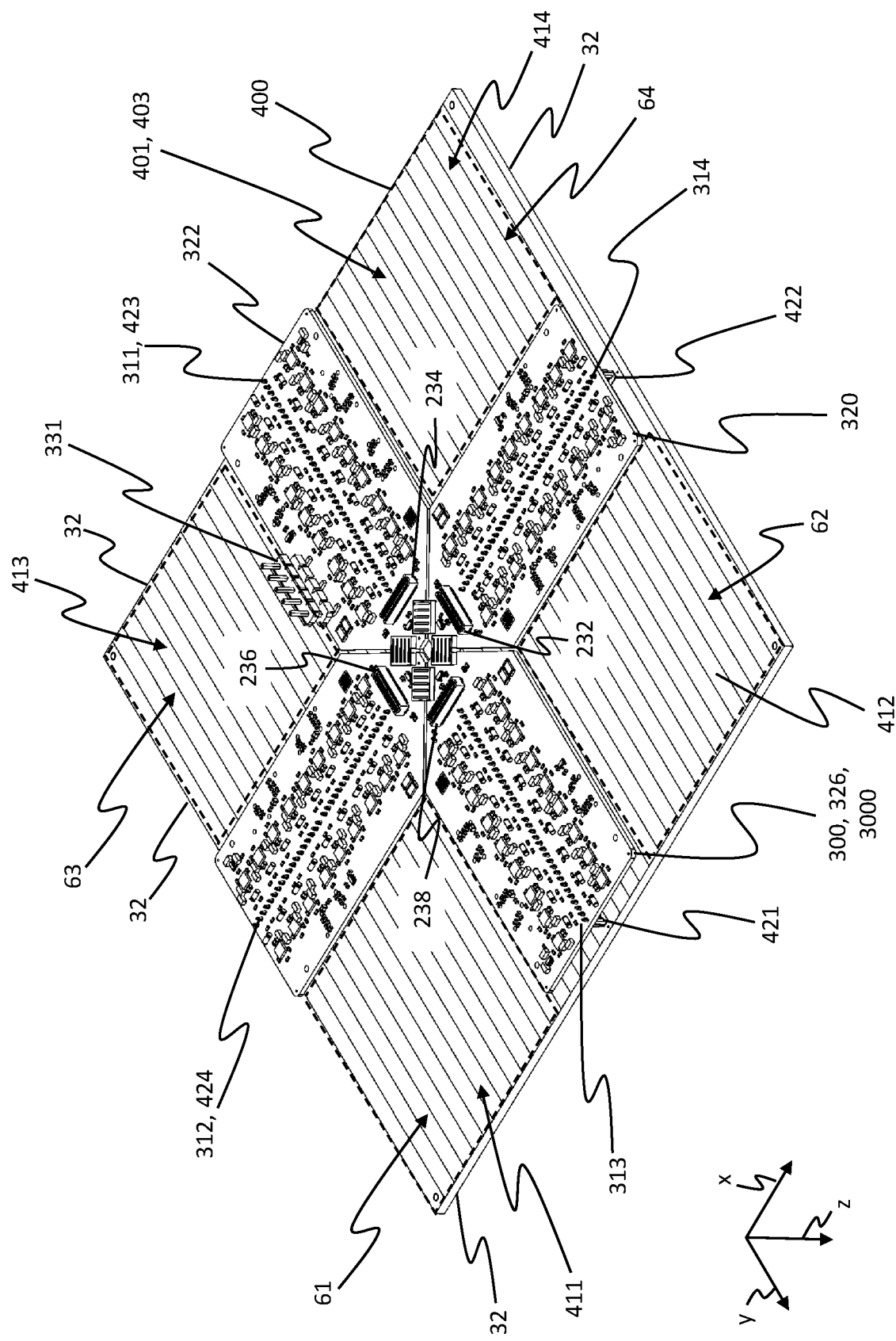
FIG. 13 shows a perspective illustration of the power module shown in FIG. 11 and the stator unit shown in FIG. 12, with the power unit and the stator unit viewed from below.

FIG. 13 shows a perspective illustration of the power module 300 shown in FIG. 11 and the stator unit 400 shown in FIG. 12, with the power module 300 and the stator unit 400 viewed from below.

The cross-shaped power module 300 is arranged underneath (shown on top in FIG. 13) the stator unit 400 and, in a view from below, covers a cross-shaped region of the stator unit 400, in which the fifth to eighth contact structure 421, 422, 423, 424 is arranged. The fifth contact structure 421 engages in the third contact structure 313 and forms a first electrical and thermal contact. The sixth contact structure 422 engages in the fourth contact structure 314 and forms a second electrical and thermal contact. The seventh contact structure 423 engages in the first contact structure 311 and forms a third electrical and thermal contact. The eighth contact structure 424 engages in the second contact structure 312 and forms a fourth electrical and thermal contact.

A further free space 61 is formed over the first stator sector 411. In addition, a second free space 62 can be formed over the second stator sector 412, a third free space 63 over the third stator sector 413 and a fourth free space 64 over the fourth stator sector 414. The first to fourth free spaces 61, 62, 63, 64 are denoted by dashed lines in FIG. 13. Each of the first to fourth free spaces 61, 62, 63, 64 is arranged over the first to fourth stator sector 411, 412, 413, 414 in a corner region of the rectangular stator unit 400, wherein the corner region adjoins the first lateral faces 32 of the stator unit 400 which extend along the x direction and along the y direction in each case. The first to fourth free space 61, 62, 63, 64 is designed to be rectangular and extends in the x and y direction between one of the first lateral faces 32 of the stator unit 400 and an external edge of the power module 400.

A stator underside 403 of the stator unit 400 is not covered by the power module 300 at the first to fourth free spaces 61, 62, 63, 64. If the stator module is in the partially assembled state in which the stator unit 400 is only assembled on the power module 300, the stator underside 403 of the stator unit 400 is accessible from below at the free spaces 61, 62, 63, 64.

A total-area proportion of all first to fourth free spaces 61, 62, 63, 64 together amounts to more than 30% of a total area of the stator underside 403. In particular, the total-area proportion of the first to fourth free spaces 61, 62, 63, 64 amounts to more than 40%, more than 50%, in particular 52% to 56%, in particular 54%, of the stator underside 403 of the stator unit 400.

Figure 14:
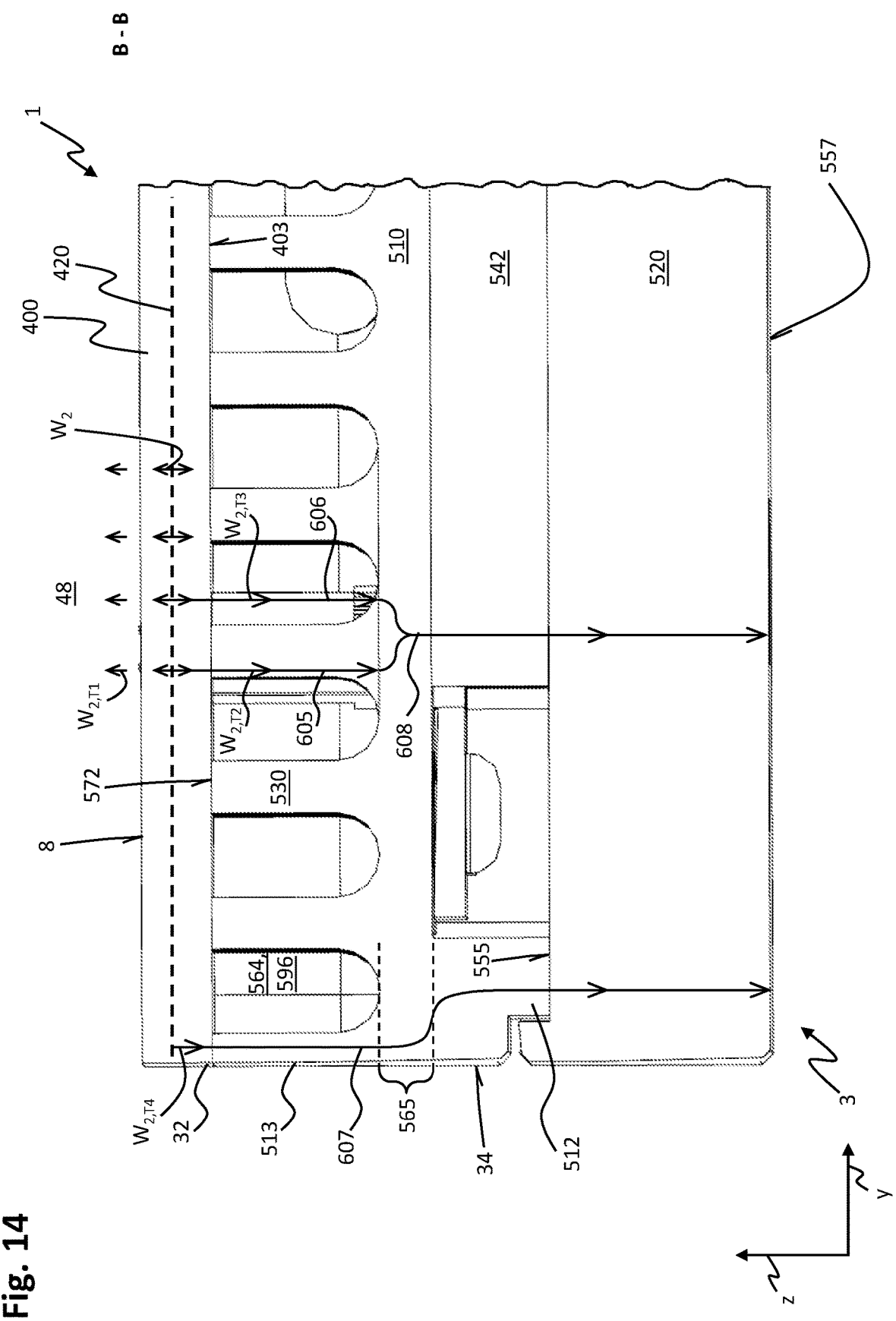
FIG. 14 shows an enlarged detail along a section plane B-B, shown in FIG. 1, through the planar actuator system shown in FIG. 1.

FIG. 14 shows an enlarged detail of a sectional view along a section plane B-B (shown in FIG. 1) through the planar actuator system 1 shown in FIG. 1.

The connection module is electrically connected to the sensor module and the power module. During operation of the planar actuator system 1, the drive energy is transferred from the connection module to the power module. The power module is controlled by the processing unit based on information provided to the processing unit via the data connection and on the determined position of the moving body, and generates the coil current using the drive energy and on the basis of the control, and controls one or more coil conductors 402 using the coil current to generate the magnetic field.

As a result of resistance losses thereby occurring in the coil conductor 402, a second heat $W_2$ is introduced into the stator unit 400. As a result of the good thermal conductivity of the stator unit 400, the stator unit 400 is uniformly heated by the second heat $W_2$ so that the stator unit 400 has substantially the same temperature at the upper side and underside. A first proportion $W_{2,T1}$ of the second heat $W_2$ is transferred to the environment 48 at the module upper side 8 by convection and heat radiation.

A second proportion $W_{2,T2}$, a third proportion $W_{2,T3}$ and a fourth proportion $W_{2,T4}$ of the heat $W_2$ is dissipated from the stator unit 400 at the underside by the cooling device 3. In this case, the second proportion $W_{2,T2}$ of the second heat $W_2$ is transferred, via a heat path 605, from the stator unit 400 to the first heat-conducting structure 530 at the underside as a result of the first contact surface 572 of the first heat-conducting structure 530 abutting against the stator underside 403. The first heat-conducting structure 530 passes the second proportion $W_{2,T2}$ of the second heat $W_2$ along the first heat path 605 to the cover portion 565.

If the first interior space 564 is potted completely with the second potting compound 596, the third proportion $W_{2,T3}$ of the second heat $W_2$ is dissipated from the stator unit 400 at the underside along a second heat path 606 of the second potting compound 596 and transferred to the cover portion 565 along the second heat path 606 via the second potting compound 596. Owing to the good thermal conductivity of the fourth material, the first and second heat path 605, 606 combine to form a common heat path 608 in the cover portion 565.

The common heat path 608 extends from the top downwards, via the cover portion 565 to the second heat-conducting structure 542. As a result of the thermal coupling of the second heat-conducting structure 542 to the housing base 520, the common heat path 608 continues into the housing base 520. In the housing base 520, the common heat path 608 extends to the first and second fastening portion 557. The second and third proportion $W_{2,T2}$, $W_{2,T3}$ of the second heat $W_2$ is transferred via the common heat path 608 to the first and second fastening portion 557 and diverted from there in the direction of the heat sink.

The fourth proportion $W_{2,T4}$ of the second heat $W_2$ is dissipated from the stator unit 400 along a third heat path 607, laterally adjacent to the first lateral face 32 at the stator underside 403, via the thermal coupling of the second edge 513 to the housing cover 510. The fourth proportion $W_{2,T4}$ of the second heat $W_2$ is passed from the second edge 513 to the cover portion 565. The cover portion 565 passes the fourth proportion $W_{2,T4}$ of the second heat $W_2$ to the third edge 512 along the third heat path 607, adjacent to the second lateral face 34. The third edge 512 is thermally coupled by abutting against the housing base 520. The third heat path 607 extends a short distance through the housing base 520 to the first and second fastening portion 557, at which the fourth proportion $W_{2,T4}$ of the second heat $W_2$ is conducted out of the stator module 2 to the heat sink 5.

As a result of the second heat $W_2$ being dissipated from the stator unit 400 at both the upper side and the underside, overheating of the preferably multilayered stator unit 400 is reliably prevented. In particular, in this case, a high mechanical load-bearing capacity of the stator unit 400 is ensured for bearing loads from the moving body.

As a result of the thermal coupling of the third fastening portion to the first fastening portion, and the fourth fastening portion 591 to the second fastening portion, the second to fourth proportion $W_{2,T2}$, $W_{2,T3}$, $W_{2,T4}$ of the second heat $W_2$ is diverted from the housing base 520 into the carrier element 40, 41. The carrier element 40, 41 absorbs the second to fourth proportion $W_{2,T2}$, $W_{2,T3}$, $W_{2,T4}$ of the second heat $W_2$ via the first and second fastening portions 556, 557.

The carrier element 40, 41 (c.f. FIGS. 1 and 2) heats the heat-carrier medium 47 flowing in the carrier element 40, 41 internally. By means of the delivery pump 49, the heat-carrier medium 47 is delivered in the circuit between the carrier elements 40, 41 and the heat exchanger 44 via the first to fourth fluid lines 51, 53, 54, 55. The heat-carrier medium 47 consequently guides the second to fourth proportion $W_{2,T2}$, $W_{2,T3}$, $W_{2,T4}$ of the second heat $W_2$ from the carrier element 40, 41 to the heat exchanger 44. The heat exchanger 44 transfers the second to fourth proportion $W_{2,T2}$, $W_{2,T3}$, $W_{2,T4}$ of the second heat $W_2$ from the primary side 45 to the secondary side 46, so that the heat-carrier medium 47 is cooled in the heat exchanger 44. Consequently, the stator module 2 can be reliably protected against overheating during operation of the stator unit 400.

As a result of the thermal conductivity of the housing base 520 and the module cover 110, part of the second to fourth proportion $W_{2,T2}$, $W_{2,T3}$, $W_{2,T4}$ of the second heat $W_2$ can be diverted from the housing base 520 to the module cover 110 by the common heat path 607 and the third heat path 608. The part of the second heat $W_2$ which is transferred to the module cover 110 is, like the first heat, emitted from the module cover 110 to the environment 48.

Figure 15:
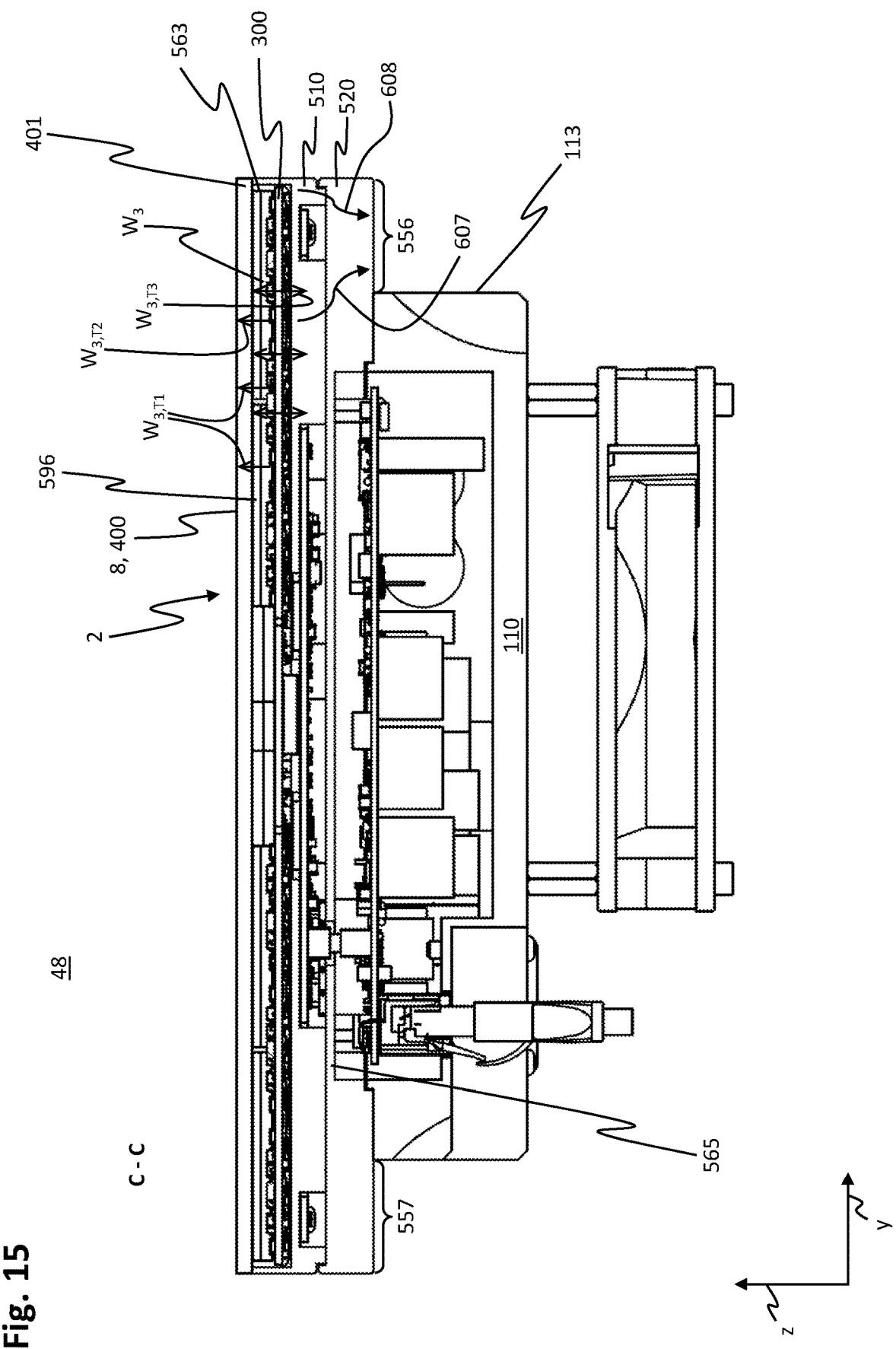
FIG. 15 shows a sectional view along a section plane C-C, shown in FIG. 1, through the stator module.

FIG. 15 shows a sectional view along a section plate C-C (shown in FIG. 1) through the stator module 2.

During operation of the stator module 2, in addition to the stator unit 400, the power module 300 also becomes heated owing to resistance losses in the power module 300. In this case, the power module 300 generates a third heat $W_3$. In this case, a first proportion $W_{3,T1}$ of the third heat $W_3$ is transferred upwards in the direction of the module upper side 8 to the stator unit 400 via the second potting compound 596. The first proportion $W_{3,T1}$ of the third heat $W_3$ is absorbed by the stator unit 400.

A second proportion $W_{3,T2}$ of the third heat $W_3$ is furthermore transferred directly to the stator unit 400 via the first to fourth contact structure. The good thermal conductivity of the stator unit 400 ensures that the second proportion $W_{3,T2}$ of the third heat $W_3$ in the stator unit 400 is distributed laterally in the second printed circuit board 401 by the contact structure. As a result of electrical and electronic components of the power module 300, in particular H-bridge circuits, being arranged spatially very near to one of the first to fourth contact structures, good cooling of these components can be achieved via the contact structure.

As a result of the stator unit 400 being designed with very good thermal conductivity, the first proportion $W_{3,T1}$ and the second proportion $W_{3,T2}$ of the third heat $W_3$, like the second heat $W_2$ of the stator unit 400 as described with reference to FIG. 14, can be dissipated from the stator unit 400.

A third proportion $W_{3,T3}$ of the third heat $W_3$ of the power module 300 is transferred downwards to the housing cover 510 via the second potting compound 596. The housing cover 510 absorbs the third proportion $W_{3,T3}$ of the third heat $W_3$ of the power module 300 at the cover portion 565, for example. The third proportion $W_{3,T3}$ of the third heat $W_3$, together with the second and third proportion of the second heat, can then be dissipated from the stator module 2 via the common heat path 607 described above and the third heat path 608 in that the cover portion 565 diverts the third proportion $W_{3,T3}$ to the common heat path 608 in the transverse direction and in the longitudinal direction.

Diverting the third proportion $W_{3,T3}$ of the third heat $W_3$ via the third fastening portion 556 furthermore has the advantage that the power module 300 is cooled at both the upper side and the underside, so that overheating of the power module 300 can be reliably prevented. In particular, the removal of heat at the rear side is therefore important for the power module 300 since, as a result of embedding the power module 300 in the second potting compound 596, it is not possible to cool the power module 300 by convection in the third interior space 118.

Figure 16:
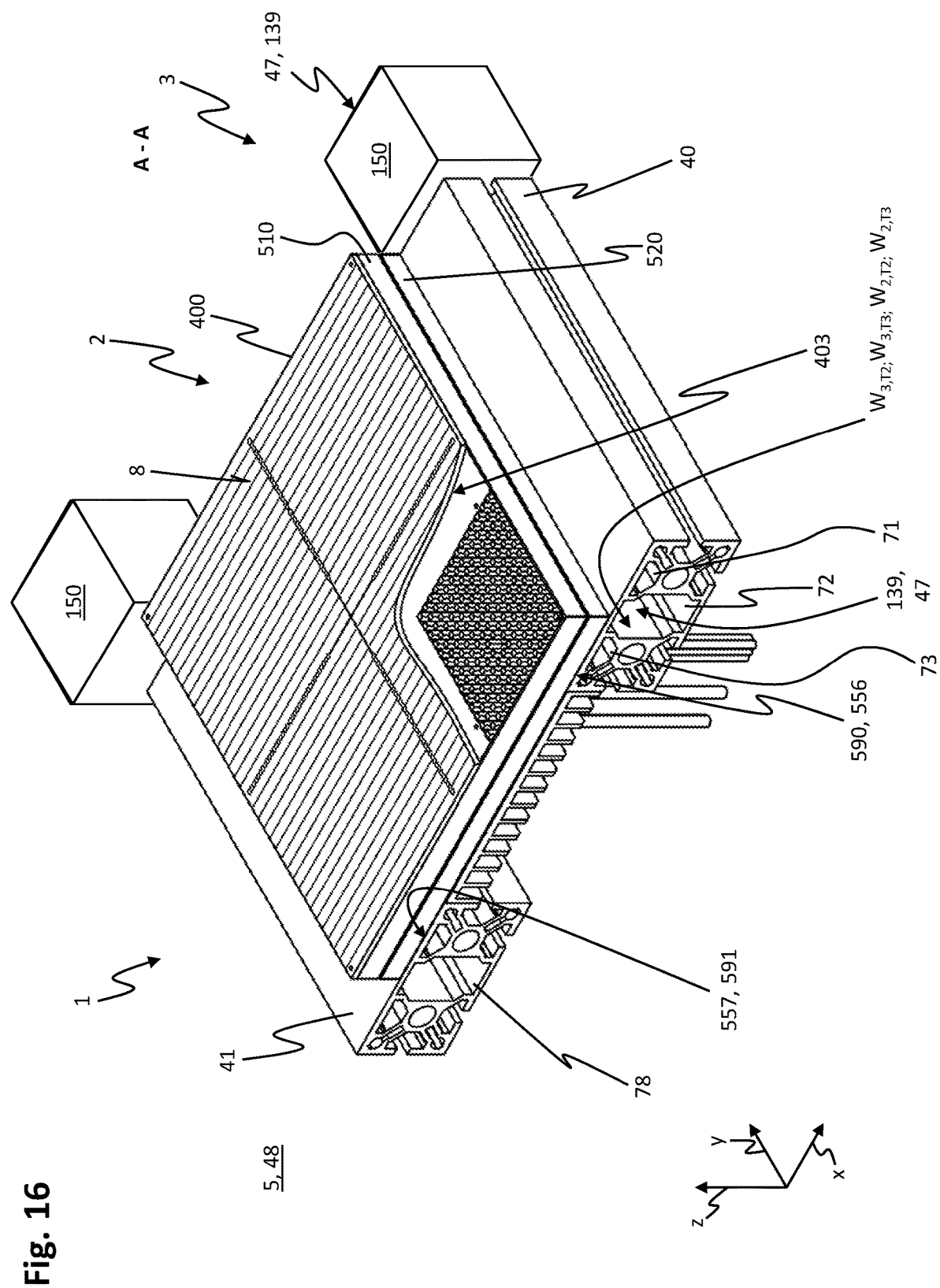
FIG. 16 shows a perspective sectional view along the section plane A-A, shown in FIG. 1, through a further development of the planar actuator system shown in FIG. 1.

FIG. 16 shows a perspective sectional view along a section plane A-A, shown in FIG. 1, through a planar actuator system 1 according to a second embodiment.

The planar actuator system 1 is designed substantially identically to the planar actuator system 1 shown in FIGS. 1 to 16. Only the differences in relation to the planar actuator system 1 shown in FIGS. 1 to 16 will be discussed below.

The planar actuator system 1 which is shown in FIG. 16 is designed to be substantially simplified in that the cooling device 3 shown in FIG. 16 is designed particularly simply. Although the cooling device 3 in the embodiment has forced cooling for the third and fourth fastening portion 590, 591, this is achieved in that a second fan 150 is provided at each end of the carrier elements 40, 41, and the cooling circuit 43 as described in FIG. 1 is omitted. In this case, the number of second fans 150 provided can correspond to the number of carrier elements 40, 41. The number of second fans 150 can also be greater than the number of carrier elements 40, 41, for example in that a respective second fan 150 is provided at each of the two ends of the carrier elements 40, 51. Additionally or alternatively, however, an arrangement of second fans 150 at individual carrier elements 40, 41 can also be omitted.

Upon activation of the second fan 150, air 139 is delivered from the environment 48 into the respective conducting space 71, 78 as a heat-carrier medium 47. The heat-carrier medium 47 flows through the carrier element 40, 41 and absorbs the proportions of the second and third heat $W_2$ and $W_3$ which are transferred to the carrier element 40, 41 and dissipates them from the carrier element 40, 41 to cool the carrier element 40, 41.

This configuration has the advantage that the planar actuator system 1 is designed particularly simply and cost-effectively. Furthermore, the second fan 150 can also be easily retrofitted in existing systems. This is particularly advantageous if, for example due to a change of application, a load profile of the stator module 2 changes, in particular a load increases, and it can no longer be dissipated from the stator module 2 via the first fan 112, for example.

Alternatively, it is also conceivable that the second fan 150 is omitted completely and the proportions of the second and third heat $W_2$, $W_3$ which are introduced into the third and fourth fastening portion 590, 591 are transferred by the carrier element 40, 41 to the environment 48 at the underside and laterally exclusively via convention, and the stator module 2 is therefore passively cooled at the first and second fastening portions 556, 557. The passive cooling of the first and second fastening portion is particularly advantageous if the first fan, as described in FIG. 2, is provided. This configuration has the advantage that the planar actuator system 1 is designed particularly simply and cost-effectively. This configuration is also advantageous in particular if the second fan 150 is to be optionally retrofitted at a later time.

In a further development of the configuration shown in FIG. 16, the second fan 150 is omitted. The first carrier element 40 and the second carrier element 51 have a plate-shaped solid profile as the carrier profile.

It is particularly advantageous if the first carrier element 40 and the second carrier element 41 are part of a carrier plate arranged at the underside of the stator module 2, wherein the first carrier element 40 is designed in one piece and integrally with the second carrier element 41. By using the solid profile for the first and second carrier element 40, 41, the first and second carrier element 40, 41 can be designed to be narrower in the z direction than is shown in FIG. 16. The proportions of the second and third heat $W_2$, $W_3$ which are introduced into the first and second carrier element 40, 41 are diverted by the first and second carrier element 40, 41 to the environment 48, which forms the heat sink 5.

Figure 17:
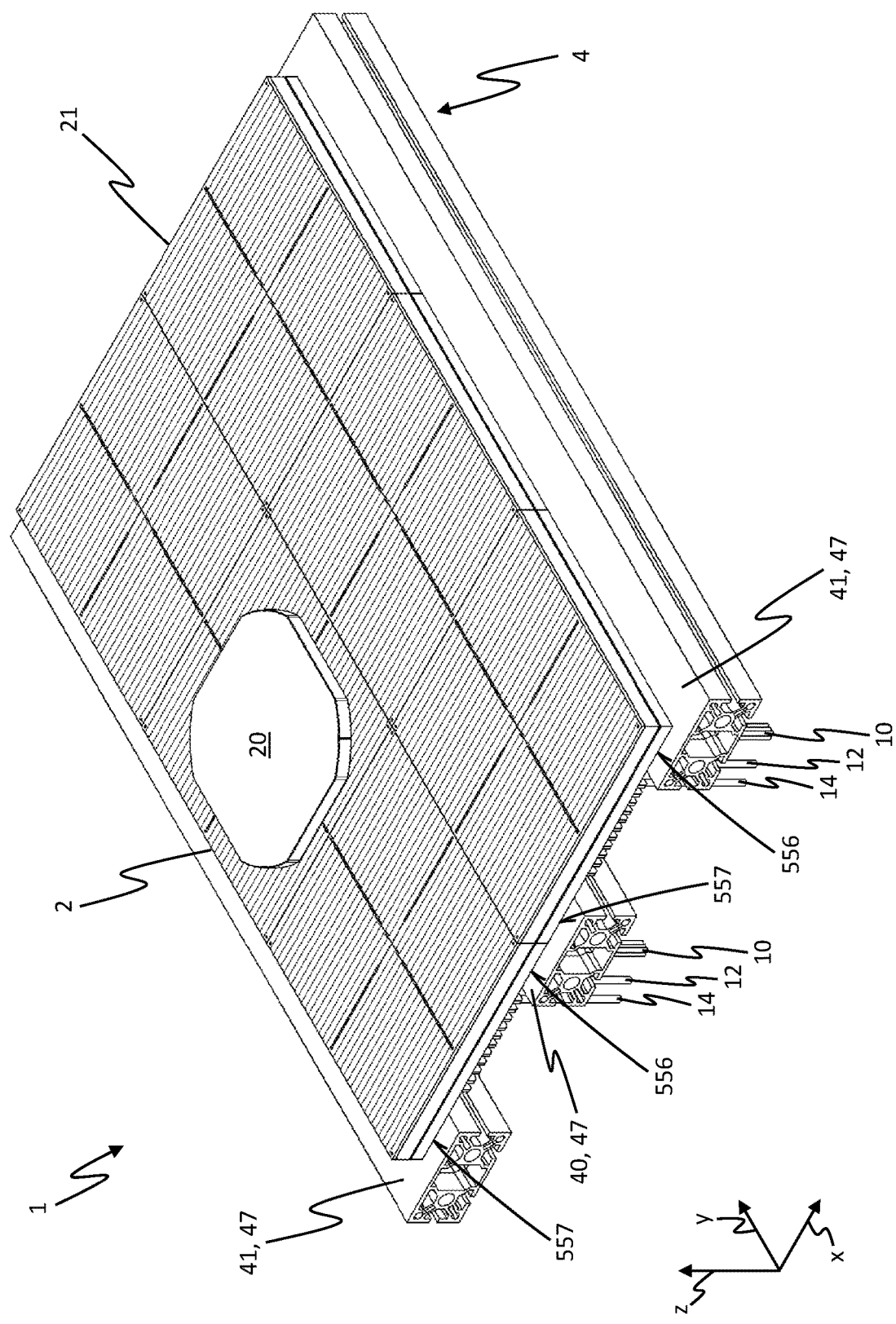
FIG. 17 shows a perspective illustration of a planar actuator system, with the planar actuator system viewed from above.

FIG. 17 shows a perspective illustration of a further planar actuator system 1 in accordance with a view of the planar actuator system 1 from above.

Unless mentioned otherwise, the planar actuator system 1 in FIG. 17 is identical to the planar actuator system 1 explained in FIGS. 1 to 16. The differences will be discussed below.

The planar actuator system 1 has a plurality, in particular a count of six, stator modules 2 (explained in FIGS. 1 to 16), which are arranged adjacent to one another, abutting against one another at the lateral faces. The carrier device 4 is provided at the underside to support the stator module 2. In this case, the first and second carrier elements 40, 41 are designed to be wide enough in the y direction for three stator modules 2 to lie in a row on the upper side of a respective carrier element 40, 41 in the y direction. The planar actuator system 1 furthermore has at least two columns of stator modules 2. In this case, a first of the stator modules 2 lies on the first carrier element 40 by means of the first fastening portion 556 and the further stator module 2, arranged adjacent to the stator module 2, lies with the second fastening portion 557 on the first carrier element 40. As a result of two stator modules 2 in each case lying next to one another on the carrier element 40, 41 by means of the first and second fastening portion 566, the carrier device 4 can be designed particularly simply and cost-effectively. Furthermore, a particularly low amount of heat-carrier medium 47 is required to cool the stator module 2 at the underside.

It is pointed out that the arrangement of the stator module 2 on the carrier device 4 is shown by way of example in FIG. 17. In particular, it is also conceivable in this case for the stator modules 2 to be arranged in another manner, for example extending over a large area. The carrier device 4 can also be widened according to the number of rows of stator modules 2, so that a plurality of carrier elements 40, 41 are provided. In the embodiment, the carrier elements 40, 41 are each arranged offset from another in the y direction and extend parallel to one another. It goes without saying that, in addition to supporting a plurality of stator modules 2, the carrier elements 40, 41 can also be arranged in the form of a cross. Alternatively, it is also conceivable that, in addition to the carrier elements 40, 41 shown, intermediate supports are also provided, which support the carrier elements 40, 41.

In contrast to the configuration shown in FIG. 17, it is also possible for the heat carrier medium 47 to flow through only part of the carrier elements 40, 41. It is also conceivable for the embodiment shown in FIG. 17 to be combined with the variant explained in FIG. 17, so that forced cooling of the carrier elements 40, 41 by the heat-carrier medium 47 is omitted and, at the underside, the stator module 2 is cooled exclusively convectively via the carrier elements 40, 41.

It can furthermore also be provided that the carrier elements 40, 41 have a further cooling rib structure in order to provide a particularly high cooling capacity. In this case, it is particularly advantageous if the cooling rib structure is arranged on the carrier element 40, 41 at the underside, in a region which is located in a flow region of the first fan.

TABLE 1

List of References: 1-150

1 Planar actuator system
2 Stator module
3 Cooling device
4 Carrier device
5 Heat sink
8 Module upper side
9 Module underside
10 Energy supply line
11 Connector
12 Data line
14 Further data line
20 Moving body
21 Further stator module
32 First lateral face (of the stator unit)
34 Second lateral face (of the housing cover)
36 Third lateral face (of the housing base)
40 First carrier element
41 Second carrier element
42 Machine bed
43 Cooling circuit
44 Heat exchanger
45 Primary side TABLE 1-continued List of References: 1-150

46 Secondary side
47 Heat carrier medium
48 Environment
49 Delivery pump
51 First fluid line
52 Output side
53 Second fluid line
55 Fourth fluid line
56 Input side
61 First free space
62 Second free space
63 Third free space
64 Fourth free space
70 First carrier profile
71 First conducting space
74 First fastening face
75 First fastening region
55 Fourth fluid line
76 Second carrier profile
77 Second fastening region
78 Second conducting space
81 Second fastening face
100 Connection module
110 Module cover
112 First fan
113 Cooling rib structure
114 Cooling rib
115 First carrier-element lateral face
116 Second carrier-element lateral face
117 Underside of the carrier element
118 Third interior space
121 First contact unit
122 Second contact unit
133 First cooling rib portion
134 Second cooling rib portion
135 Underside of the module cover
137 First recess
139 Air
140 Gap
142 Lead-through
143 First potting compound
150 Second fan

TABLE 2

List of References: 200-424

200 Sensor module
201 First printed circuit board
202 First processing unit
203 First contact face
204 Second processing unit
205 Second contact face
206 Position-detection unit
207 Third contact unit
220 Connecting cutout
231 First coupling element
232 First mating element
233 Second coupling element
234 Second mating element
235 Third coupling element
236 Third mating element
237 Fourth coupling element
238 Fourth mating element
240 Housing passage
241 Web
242 Edge region
243 Center region of the first printed circuit board
265 Insulating layer
300 Power module
301 Underside of the power module
311 First contact structure
312 Second contact structure
313 Third contact structure
314 Fourth contact structure

TABLE 2-continued

List of References: 200-424

320 First module unit
321 First connector
322 Second module unit
323 Second connector
324 Third module unit
325 Third connector
326 Fourth module unit
327 Fourth connector
331 Fourth contact unit
400 Stator unit
401 Second printed circuit board
402 Coil conductor
403 Stator underside
411 First stator sector
412 Second stator sector
413 Third stator sector
414 Fourth stator sector
421 Fifth contact structure
422 Sixth contact structure
423 Seventh contact structure
424 Eighth contact structure

TABLE 3

List of References: 500-599

500 Cooling unit
501 Module housing
510 Housing cover
511 Third recess
512 Third edge (at the underside of the housing cover)
513 Second edge (at the upper side of the housing cover)
520 Housing base
521 First connecting opening
522 Second connecting opening
523 Third connecting opening
524 Fourth connecting opening
525 Fifth connecting opening
526 Sixth connecting opening
527 Seventh connecting opening
530 First heat-conducting structure
534 Housing-base upper side
542 Second heat-conducting structure
543 Center region of the housing cover
544 First intermediate space
553 Cover upper side
554 Cover underside
555 Base upper side
556 First fastening portion
557 Second fastening portion
560 Second interior space
561 Second recess
562 Second recess base
563 First edge
564 First interior space
565 Cover portion
566 First housing portion
567 Second housing portion
568 Third housing portion
569 Fourth housing portion
570 Fifth housing portion
571 First heat-conducting element
572 First contact face
577 Second receptacle
578 First processing-unit receptacle
579 Second processing-unit receptacle
581 Second heat-conducting element
582 Third heat-conducting element
583 Fourth heat-conducting element
584 Second contact face
585 First diagonal
586 Second diagonal
587 Third contact face
588 Connecting passage
589 Fourth contact face

TABLE 3-continued

List of References: 500-599

590 Third fastening portion
591 Fourth fastening portion
592 Second fastener
593 Third fastener
594 First receptacle
595 Fill opening
596 Second potting compound
597 Second intermediate space
598 First receptacle base
599 Second receptacle base

TABLE 4

List of References: 600-3000

600 First heat-conducting-element lateral face
601 Second heat-conducting-element lateral face
602 Third heat-conducting-element lateral face
603 Fourth heat-conducting-element lateral face
604 Fifth heat-conducting-element lateral face
605 First heat path
606 Second heat path
607 Third heat path
608 Common heat path
620 First row
621 Second row
1000 Further control unit
3000 Control unit

TABLE 5

List of Reference Symbols: Heat

| | |
|---|---|
| $W_1$ First heat (emitted by the connection module) | $W_2$ Second heat (emitted by the stator unit) |
| $W_{2,T1}$ First proportion of the second heat | $W_{2,T2}$ Second proportion of the second heat |
| $W_{2,T3}$ Third proportion of the second heat | $W_{2,T4}$ Fourth proportion of the second heat |
| $W_3$ Third heat (emitted by the power module) | $W_{3,T1}$ First proportion of the third heat |
| $W_{3,T2}$ Second proportion of the third heat | $W_{3,T3}$ Third proportion of the third heat |

The invention claimed is:

1. A stator module for a planar actuator system, wherein the stator module has:
   a module upper side extending in a plane and a module underside opposite the module upper side,
   a stator unit, and
   a cooling unit,
   wherein the stator unit has at least one coil conductor configured to be energized by a drive current to generate a magnetic field for driving a moving body of the planar actuator system, positioned at the module upper side,
   wherein the stator unit is arranged at the module upper side,
   wherein the cooling unit has a housing cover and a housing base,
   wherein the housing cover is arranged between the stator unit and the housing base,
   wherein the housing cover is at least thermally connected to a stator underside of the stator unit at a cover upper side of the housing cover,
   wherein the housing cover is thermally connected to the housing base on a cover underside facing away from the stator unit, wherein the housing base is arranged at the module underside and has a first fastening portion at the module underside,
wherein the first fastening portion is thermally connected to a heat sink,
wherein the housing cover conducts heat from the stator unit to the housing base, and
wherein the housing base conducts the heat from the housing cover to the first fastening portion, at least in part.

2. The stator module as claimed in claim 1,
wherein the housing cover has a first housing portion and a second housing portion on the side facing the stator unit,
wherein the first housing portion and the second housing portion adjoin one another,
wherein the housing cover has at least one first heat-conducting structure at the first housing portion,
wherein the first heat-conducting structure comprises at least one first heat-conducting element,
wherein the first heat-conducting element extends in the direction of the stator unit and abuts against the stator unit at a contact face and is thermally coupled to the stator unit, and
wherein a control unit of the stator module is arranged in the second housing portion.

3. The stator module as claimed in claim 2,
wherein the first heat-conducting structure comprises a plurality of first heat-conducting elements, and
wherein the first heat-conducting elements are arranged at a spacing from one another.

4. The stator module as claimed in claim 2,
wherein the first heat-conducting element is in the form of a pin,
wherein the housing cover has a cover portion in the form of a plate,
wherein the cover portion is arranged at a spacing from the stator unit,
wherein, in each case, the first heat-conducting element is connected to the cover portion by a side opposite the contact face, and
wherein the first heat-conducting element is aligned at an angle, or perpendicularly, to the cover portion.

5. The stator module as claimed in claim 4,
wherein the cover portion and the stator unit delimit a first interior space of the stator module, and
wherein the first interior space is filled with a thermally conductive and electrically insulating potting compound such that the control unit is embedded in the potting compound, and the potting compound transfers heat from the stator unit and/or the control unit to the housing cover.

6. The stator module as claimed in claim 2,
wherein the second housing portion is flat on the cover upper side,
wherein the housing cover has an edge on the side facing the stator unit,
wherein the edge is formed circumferentially at the housing cover and delimits the interior space laterally,
wherein the edge extends in the direction of the stator unit,
wherein the first heat-conducting structure is arranged between the second housing portion and the edge, and
wherein the first heat-conducting structure extends over the entire first housing portion between the edge and the second housing portion.

7. The stator module as claimed in claim 1,
wherein the housing cover has a cover portion in the form of a plate, a further edge on a side facing the housing base, a second heat-conducting structure and a center region,
wherein the further edge is arranged at the cover portion and extends in the direction of the housing base,
wherein the second heat-conducting structure adjoins the further edge internally and has at least one second heat-conducting element,
wherein the second heat-conducting element is connected to the cover portion on the side facing away from the housing base and is thermally connected to the housing base on the side facing the housing base,
wherein the second heat-conducting structure of the center region is arranged internally and is surrounded by the second heat-conducting structure, and
wherein the center region is planar and is arranged at a spacing from the housing base.

8. The stator module as claimed in claim 7, having:
a sensor module,
wherein the housing cover and the housing base delimit a second interior space,
wherein the sensor module is arranged in the second interior space,
wherein the sensor module is electrically connected to the control unit,
wherein the sensor module has at least one position-detection unit for detecting a magnetic field of the moving body, a printed circuit board and at least one processing unit,
wherein the position-detection unit is connected to the printed circuit board,
wherein the printed circuit board connects the processing unit to the position-detection unit,
wherein the processing unit is arranged on a side of the printed circuit board which faces the housing cover,
wherein a processing-unit receptacle is arranged in the cover portion on a side facing the housing base,
wherein the processing-unit receptacle corresponds to the processing unit,
wherein the processing unit engages in the processing-unit receptacle, at least in certain portions,
wherein the processing unit is thermally connected to the cover portion, and
wherein the cover portion dissipates heat from the processing unit, and to conduct it to the housing base, for the purpose of cooling the processing unit.

9. The stator module as claimed in claim 7,
wherein the printed circuit board has at least one housing passage,
wherein the housing passage corresponds to the second heat-conducting element, at least in certain portions, and
wherein the second heat-conducting element passes through the housing passage and abuts against the housing base at the end.

10. The stator module as claimed in claim 7,
wherein the second heat-conducting structure has a plurality of second heat-conducting elements,
wherein the second heat-conducting elements are arranged at a pre-defined spacing, or at a regular spacing, from one another,
wherein an intermediate space is arranged between the two heat-conducting elements, and
wherein the printed circuit board is arranged in the intermediate space, at least in certain portions.

11. The stator module as claimed in claim 1, having:
a module cover, and
a further control unit,
wherein the housing base and the module cover delimit a third interior space,
wherein the further control unit is arranged in the third interior space,
wherein the module cover is arranged on a side facing away from the housing cover and such that it is offset from the first fastening portion,
wherein the module cover is thermally connected to the further control unit, and
wherein the module cover has a cooling rib structure on a side facing away from the housing base.

12. The stator module as claimed in claim 11,
wherein the housing base has a second fastening portion at the module underside,
wherein the module cover is arranged between the first fastening portion and the second fastening portion,
wherein the second fastening portion is thermally coupled to the heat sink and conducts heat to the heat sink, and
wherein the first fastening portion and the second fastening portion are arranged in a common plane and aligned parallel to the module upper side.

13. The stator module as claimed in claim 11,
wherein the third interior space is filled with a further potting compound such that the further control unit is embedded in the potting compound,
wherein the further potting compound is thermally conducting and connects the further control unit to the module cover, and
wherein the module cover is thermally conducting and transfers a further heat of the further potting compound to the cooling rib structure, and the cooling rib structure transfers the further heat to the environment.

14. A planar actuator system having a stator module as claimed in claim 1, and further comprising:
a cooling device, and
a carrier device, wherein the carrier device comprises at least a first carrier element,
wherein the first carrier element is mechanically connected to the stator module and carries the stator module,
wherein the first carrier element has a third fastening portion on a side facing the stator module,
wherein the first fastening portion and the third fastening portion are thermally coupled to one another and divert at least a proportion of the heat from the first fastening portion to the third fastening portion, and
wherein the first carrier element diverts the proportion of the heat from the third fastening portion.

15. The planar actuator system as claimed in claim 14,
wherein the cooling device has at least one heat carrier medium,
wherein the first carrier element delimits at least one first conducting space such that it is fluidically sealed with respect to an environment of the first carrier element,
wherein the heat carrier medium is arranged in the first conducting space and is thermally coupled to the third fastening portion, and
wherein the heat carrier medium dissipates the proportion of the heat from the first carrier element and to conduct it to the heat sink.

16. The planar actuator system as claimed in claim 15,
wherein the cooling device has a delivery pump and a heat exchanger,
wherein the heat exchanger has a primary side and a secondary side,
wherein the delivery pump is fluidically connected to the first conducting space and to the primary side of the heat exchanger,
wherein the delivery pump delivers the heat carrier medium in a circuit between the primary side and the first conducting space,
wherein the secondary side is thermally connected to the heat sink, and
wherein the heat exchanger conducts the heat from the primary side to the secondary side and to transfer it to the heat sink at the secondary side.

17. The planar actuator system as claimed in claim 14,
wherein the carrier device has a second carrier element,
wherein the second carrier element delimits a second conducting space such that it is fluidically sealed with respect to the environment of the second carrier element,
wherein the second carrier element is arranged offset from the first carrier element,
wherein the second carrier element has a fourth fastening portion on a side facing the stator module,
wherein the second fastening portion and the fourth fastening portion are thermally connected to one another and conduct heat from the second fastening portion to the fourth fastening portion,
wherein the fourth fastening portion is thermally connected to the second conducting space,
wherein the heat carrier medium flows through the second conducting space, and
wherein the heat carrier medium dissipates the heat from the fourth fastening portion.

18. The planar actuator system as claimed in claim 17,
wherein the carrier device has a fluid line,
wherein the fluid line fluidically connects the first conducting space to the second conducting space,
wherein the heat carrier medium is arranged in the fluid line,
wherein the heat carrier medium is adapted to flow through the first conducting space, the fluid line and the second conducting space, and
wherein the heat carrier medium dissipates the heat from the fourth fastening portion.

19. The planar actuator system as claimed in one of claim 14,
wherein the first carrier element has a hollow profile, at least in certain portions, or
wherein the first carrier element has a solid profile in the form of a plate.

* * * * *